United States Patent
Gong et al.

(10) Patent No.: US 11,294,934 B2
(45) Date of Patent: Apr. 5, 2022

(54) COMMAND PROCESSING METHOD AND SERVER

(71) Applicant: Huawei Technologies Co., Ltd., Shenzhen (CN)

(72) Inventors: Yili Gong, Wuhan (CN); Wentao Ma, Wuhan (CN); Huihua Shi, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 574 days.

(21) Appl. No.: 15/868,303

(22) Filed: Jan. 11, 2018

(65) Prior Publication Data

US 2018/0137188 A1    May 17, 2018

Related U.S. Application Data

(63) Continuation of application No. PCT/CN2016/073941, filed on Feb. 17, 2016.

(30) Foreign Application Priority Data

Jul. 14, 2015    (CN) .......................... 201510412831.4

(51) Int. Cl.
*G06F 16/23* (2019.01)
*G06F 16/27* (2019.01)
(Continued)

(52) U.S. Cl.
CPC .......... *G06F 16/275* (2019.01); *G06F 9/5038* (2013.01); *G06F 9/52* (2013.01);
(Continued)

(58) Field of Classification Search
CPC ........ G06F 9/466; G06F 16/27; G06F 16/178; G06F 16/182; G06F 16/275;
(Continued)

(56) References Cited

U.S. PATENT DOCUMENTS 6,393,434 B1 * 5/2002 Huang .................... G06F 16/27
2004/0066779 A1 4/2004 Barrack et al.
(Continued)

FOREIGN PATENT DOCUMENTS

CN  1497433 A  5/2004
CN  101351789 A  1/2009
(Continued)

OTHER PUBLICATIONS

Lloyd et al. "Don't Settle for Eventual: Scalable Causal Consistency for Wide-Area Storage with COPS," Proceedings of the 23nd ACM Symposium on Operating Systems Principles, SOSP'11, pp. 1-16, (Oct. 23-26, 2011).
(Continued)

*Primary Examiner* — Marcin R Filipczyk
(74) *Attorney, Agent, or Firm* — Leydig, Voit & Mayer, Ltd.

(57) ABSTRACT

A command processing method to reduce a system delay and system complexity while ensuring system consistency. A server receives from a client a target request that carries a target command. The server uses a current time as a target timestamp of the target request, adds a local associated command corresponding to the target context number and a local conflicted command corresponding to the target command to a target dependency set, and forwards the target request to a replica server. The server updates the target dependency set according to a feedback from the replica server, and stores an updated target dependency set synchronously with the replica server. And the server determines a target execution sequence of the target command and each command in the updated target dependency set.

19 Claims, 9 Drawing Sheets

(51) Int. Cl.
*G06F 9/52* (2006.01)
*G06F 9/50* (2006.01)
*H04L 67/1095* (2022.01)
*H04L 67/01* (2022.01)

(52) U.S. Cl.
CPC ...... *G06F 16/2365* (2019.01); *G06F 16/2379* (2019.01); *H04L 67/1095* (2013.01); *G06F 2209/484* (2013.01); *H04L 67/42* (2013.01)

(58) Field of Classification Search
CPC .. G06F 16/2365; G06F 16/9024; G06F 3/065; G06F 16/2379; G06F 9/52; G06F 9/5038; G06F 2209/484; H04L 67/42; H04L 67/1095
See application file for complete search history.

(56) References Cited

U.S. PATENT DOCUMENTS

| | | |
|---|---|---|
| 2007/0156486 A1 | 7/2007 | Sanabria et al. |
| 2009/0064151 A1* | 3/2009 | Agarwal ............... G06F 9/5038 718/102 |
| 2011/0004614 A1 | 1/2011 | Chow et al. |
| 2011/0138398 A1 | 6/2011 | Allen et al. |
| 2013/0212590 A1 | 8/2013 | Allen et al. |
| 2014/0366037 A1 | 12/2014 | Berretta et al. |
| 2015/0128139 A1* | 5/2015 | Suzuki ................ G06F 9/45558 718/1 |
| 2015/0172412 A1* | 6/2015 | Escriva ................. G06F 16/182 709/202 |
| 2015/0172414 A1* | 6/2015 | Richardson ............. G06F 13/00 709/203 |
| 2018/0322030 A1* | 11/2018 | Davis .................... G06F 11/362 |

FOREIGN PATENT DOCUMENTS

| | | |
|---|---|---|
| CN | 102640113 A | 8/2012 |
| CN | 104317843 A | 1/2015 |

OTHER PUBLICATIONS

Moraru et al., "There Is More Consensus in Egalitarian Parliaments," Proceedings of the Twenty-Fourth ACM Symposium on Operating Systems Principles, SOSP'13, (Nov. 3-6, 2013).

\* cited by examiner

COMMAND PROCESSING METHOD AND SERVER

CROSS-REFERENCE TO RELATED APPLICATION

This application is a continuation of International Patent Application No. PCT/CN2016/073941 filed on Feb. 17, 2016, which claims priority to Chinese Patent Application No. 201510412831.4, filed on Jul. 14, 2015. The disclosures of the aforementioned applications are hereby incorporated by reference in their entireties.

TECHNICAL FIELD

The present disclosure relates to the field of the computing technologies, and in particular, to a command processing method and a server.

BACKGROUND

As an enterprise application requires an increasing computing capability, a conventional server model can no longer meet the requirement. As network bandwidth is continuously increasing, accessing a non-local computing service by using a network becomes increasingly mature. By using a cloud computing model, all computing services tend to cluster in a cloud computing data center. Cloud computing is a business computation model, and distributes computation tasks to a resource pool that includes a large quantity of computers, so that a user can obtain a computing capability, storage space, and an information service according to a requirement. Because of instability of hardware and software, how to ensure high service reliability is becoming more important in the cloud computing.

For a cloud computing data center that includes a large-scale inexpensive server cluster, a distributed synchronization mechanism is a foundation for provisioning all upper-layer applications, and basically ensures system correctness and reliability. In a distributed system, if all nodes have a consistent initial state, and all the nodes perform a same operation sequence, the nodes may finally obtain a consistent state. To ensure that all the nodes perform a same command sequence, a "consistency algorithm" needs to be performed on each instruction, so that instructions obtained by all the nodes are consistent.

Currently, a consistency problem may be resolved by using a Clusters of Order Preserving System (COPS) algorithm. In the COPS algorithm, client consistency is implemented by storing data of multiple versions. In the COPS algorithm, a version of a corresponding request is checked in each read/write operation, and data corresponding to the version is returned, so as to ensure the client consistency. For a server side, data on the server side is synchronized by means of chain replication by using the COPS algorithm. Because concurrent operations cannot be sorted by using the COPS algorithm, a convergence operation needs to be performed for a conflict that occurs, so as to ensure status consistency of all servers. However, a convergence operation requires extra processing. This causes a system delay and increases system complexity.

SUMMARY

Embodiments of the present disclosure provide a command processing method and a server, so as to reduce a system delay and system complexity while ensuring system consistency.

A first aspect of the present disclosure provides a command processing method, including:

receiving, by a server, a target request that carries a target command and that is sent by a client, where the target command is corresponding to a target context number;

using a current time as a target timestamp of the target request;

adding a local associated command corresponding to the target context number and a local conflicted command corresponding to the target command to a target dependency set;

forwarding the target request to a replica server, updating the target dependency set according to a feedback from the replica server, and storing an updated target dependency set synchronously with the replica server, so that the replica server subsequently executes a command according to the updated target dependency set; and determining a target execution sequence of the target command and each command in the updated target dependency set according to the target context number and the target timestamp that are corresponding to the target command, and a context number and a timestamp that are corresponding to each command in the updated target dependency set, and executing the target command and each command in the updated target dependency set according to the target execution sequence.

In a first possible implementation, the adding a local associated command corresponding to the target context number and a local conflicted command corresponding to the target command to a target dependency set includes:

locally detecting a first to-be-processed request that carries a context number equal to the target context number and a timestamp less than the target timestamp, using a command in the first to-be-processed request as the associated command, and adding the associated command to the target dependency set; and locally detecting a second to-be-processed request that carries a context number unequal to the target context number and a command in read/write conflict with the target command, using the command in the second to-be-processed request as the conflicted command, and adding the conflicted command to the target dependency set.

With reference to the first aspect, in a second possible implementation, the forwarding the target request to a replica server, updating the target dependency set according to a feedback from the replica server, and storing an updated target dependency set synchronously with the replica server, so that the replica server subsequently executes a command according to the updated target dependency set includes:

forwarding the target request to the replica server, so that the replica server generates a replica dependency set according to the target context number and the target command in the target request, where the replica dependency set includes the associated command that is corresponding to the target context number and that is stored in the replica server and the conflicted command corresponding to the target command;

receiving the replica dependency set fed back by the replica server, and comparing the replica dependency set with the target dependency set; and when a comparison result is that the replica dependency set is inconsistent with the target dependency set, updating the target dependency set according to the replica dependency set, and sending an updated target dependency set to the replica server, so that the replica server synchronously stores the updated target dependency set, and the replica server subsequently executes a command according to the updated target dependency set.

With reference to the first aspect, in a third possible implementation, the using a current time as a target timestamp of the target request includes:

detecting whether the target request includes a preset timestamp; and if it is detected that the target request does not include the preset timestamp, using the current time as the target timestamp of the target request; or if it is detected that the target request includes the preset timestamp, adding the target request to a wait queue; and when it is detected that a time arrives at the preset timestamp, extracting the target request from the wait queue, and using the preset timestamp in the target request as the target timestamp of the target request.

With reference to the first aspect, in a fourth possible implementation, before the adding a local associated command corresponding to the target context number and a local conflicted command corresponding to the target command to a target dependency set, the method further includes:

detecting whether the target request carries a context number; and if it is detected that the target request does not carry a context number, selecting a target context number corresponding to the target command from a locally maintained context number set, and adding the target context number to the target request; or if it is detected that the target request carries a context number, determining the carried context number as the target context number corresponding to the target command.

With reference to the first aspect, in a fifth possible implementation, the determining a target execution sequence of the target command and each command in the updated target dependency set according to the target context number and the target timestamp that are corresponding to the target command, and a context number and a timestamp that are corresponding to each command in the updated target dependency set, and executing the target command and each command in the updated target dependency set according to the target execution sequence includes:

adding the target request to a local to-be-executed request set, and instructing the replica server to add the target request to a to-be-executed request set in the replica server, so that the replica server executes a command according to the updated target dependency set when obtaining the target request from the to-be-execution request set in the replica server by means of extraction;

when the target request is obtained from the local to-be-executed request set by means of extraction, performing topological sorting on the target command and each command in the updated target dependency set according to the target context number and the target timestamp that are corresponding to the target command, and the context number and the timestamp that are corresponding to each command in the updated target dependency set, so as to obtain a connected graph, where the connected graph includes a topology structure constructed by the target command and each command in the updated target dependency set;

if the connected graph includes a strongly connected component, performing unidirectional sorting on the strongly connected component according to a context number and a timestamp of each command in the strongly connected component, so as to obtain a target execution sequence corresponding to all commands in the connected graph; or if the connected graph does not include a strongly connected component, determining a topological order obtained by means of topological sorting as the target execution sequence; and executing all the commands in the connected graph according to the target execution sequence.

With reference to the first aspect, in a sixth possible implementation, after the using a current time as a target timestamp of the target request, the method further includes:

determining the target request that carries the target timestamp and the target context number as a to-be-processed message, and sending the to-be-processed message to the client, so that the client initiates a next request, or sends the target context number to an associated client in a same context, where the context is formed by combining multiple threads.

A second aspect of the present disclosure provides a server, including:

a receiving module, configured to receive a target request that carries a target command and that is sent by a client, where the target command is corresponding to a target context number;

a determining module, configured to use a current time as a target timestamp of the target request;

an adding module, configured to add a local associated command corresponding to the target context number and a local conflicted command corresponding to the target command to a target dependency set;

an updating module, configured to forward the target request to a replica server, update the target dependency set according to a feedback from the replica server, and store an updated target dependency set synchronously with the replica server, so that the replica server subsequently executes a command according to the updated target dependency set; and a sequential execution module, configured to determine a target execution sequence of the target command and each command in the updated target dependency set according to the target context number and the target timestamp that are corresponding to the target command, and a context number and a timestamp that are corresponding to each command in the updated target dependency set, and execute the target command and each command in the updated target dependency set according to the target execution sequence.

In a first possible implementation, the adding module includes:

a first adding unit, configured to locally detect a first to-be-processed request that carries a context number equal to the target context number and a timestamp less than the target timestamp, use a command in the first to-be-processed request as the associated command, and add the associated command to the target dependency set; and a second adding unit, configured to locally detect a second to-be-processed request that carries a context number unequal to the target context number and a command in read/write conflict with the target command, use the command in the second to-be-processed request as the conflicted command, and add the conflicted command to the target dependency set.

With reference to the second aspect, in a second possible implementation, the updating module includes:

a request forwarding unit, configured to forward the target request to the replica server, so that the replica server generates a replica dependency set according to the target context number and the target command in the target request, where the replica dependency set includes the associated command that is corresponding to the target context number and that is stored in the replica server and the conflicted command corresponding to the target command;

a comparison unit, configured to receive the replica dependency set fed back by the replica server, and compare the replica dependency set with the target dependency set; and an updating and storage unit, configured to: when a comparison result is that the replica dependency set is inconsistent with the target dependency set, update the target dependency set according to the replica dependency set, and send an updated target dependency set to the replica server, so that the updating and storage unit and the replica server synchronously store the updated target dependency set, and the replica server subsequently executes a command according to the updated target dependency set.

With reference to the second aspect, in a third possible implementation, the determining module includes:

a detection unit, configured to detect whether the target request includes a preset timestamp; and a first determining unit, configured to: if the detection unit detects that the target request does not include the preset timestamp, use the current time as the target timestamp of the target request; or a second determining unit, configured to: if the detection unit detects that the target request includes the preset timestamp, add the target request to a wait queue; and when the detection unit detects that a time arrives at the preset timestamp, extract the target request from the wait queue, and use the preset timestamp in the target request as the target timestamp of the target request.

With reference to the second aspect, in a fourth possible implementation, the server further includes:

a number detection module, configured to detect whether the target request carries a context number; and a number selection module, configured to: if the number detection module detects that the target request does not carry a context number, select a target context number corresponding to the target command from a locally maintained context number set, and add the target context number to the target request; and a number determining module, configured to: if the number detection module detects that the target request carries a context number, determine the carried context number as the target context number corresponding to the target command.

With reference to the second aspect, in a fifth possible implementation, the sequential execution module includes:

a request adding notification unit, configured to: add the target request to a local to-be-executed request set, and instruct the replica server to add the target request to a to-be-executed request set in the replica server, so that the replica server executes a command according to the updated target dependency set when obtaining the target request from the to-be-execution request set in the replica server by means of extraction;

a first sorting unit, configured to: when the target request is obtained from the local to-be-executed request set by means of extraction, perform topological sorting on the target command and each command in the updated target dependency set according to the target context number and the target timestamp that are corresponding to the target command, and the context number and the timestamp that are corresponding to each command in the updated target dependency set, so as to obtain a connected graph, where the connected graph includes a topology structure constructed by the target command and each command in the updated target dependency set;

a second sorting unit, configured to: if the connected graph includes a strongly connected component, perform unidirectional sorting on the strongly connected component according to a context number and a timestamp of each command in the strongly connected component, so as to obtain a target execution sequence corresponding to all commands in the connected graph; and a sequence determining unit, configured to: if the connected graph does not include a strongly connected component, determine a topological order obtained by means of topological sorting as the target execution sequence; and a command execution unit, configured to execute all the commands in the connected graph according to the target execution sequence.

With reference to the second aspect, in a sixth possible implementation, the server further includes:

a message sending module, configured to: determine the target request that carries the target timestamp and the target context number as a to-be-processed message, and send the to-be-processed message to the client, so that the client initiates a next request, or sends the target context number to an associated client in a same context, where the context is formed by combining multiple threads.

In the embodiments of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
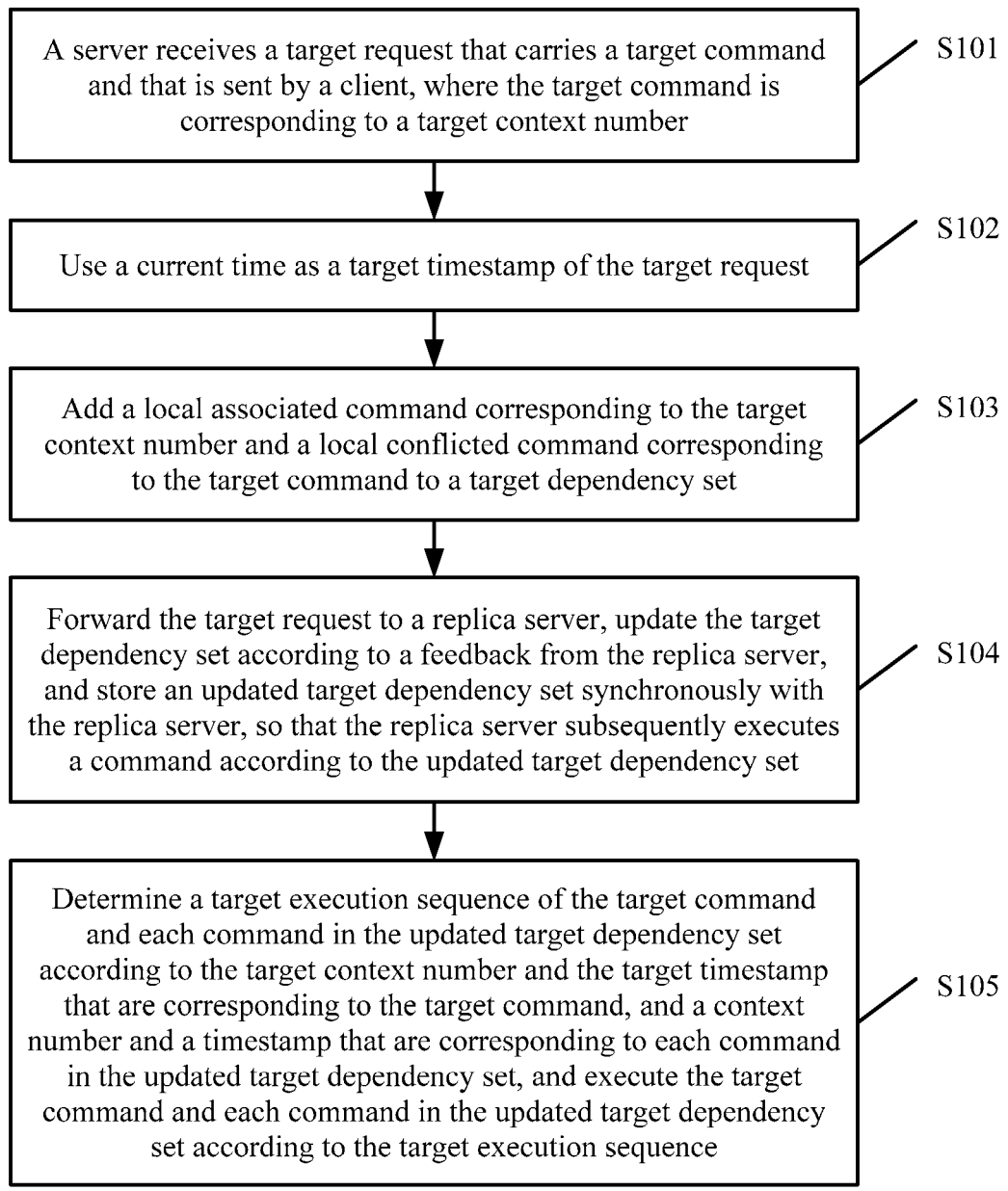
FIG. 1 is a schematic flowchart of a command processing method according to an embodiment of the present disclosure.

Referring to FIG. 1, FIG. 1 is a schematic flowchart of a command processing method according to an embodiment of the present disclosure. The method may include the following steps.

S101. A server receives a target request that carries a target command and that is sent by a client, where the target command is corresponding to a target context number.

Specifically, in a cloud computing data center that includes a server cluster, when a server in the server cluster receives a target request that carries a target command and that is sent by the client, the server may determine the server itself as a master server, and determine other servers in the cloud computing data center as a replica server. After receiving the target request, the master server may first detect whether the target request carries a context number. If the master server detects that the target request does not carry a context number, the master server may select a context number corresponding to the client from a context number set maintained by the master server, that is, a context number corresponding to the target command, determine the context number corresponding to the target command as a target context number, and add the target context number to the target request; or if the master server detects that the target request carries a context number, the master server determines the context number carried in the target request as a target context number corresponding to the target command. The context number carried in the target request is pre-obtained by the client from the server. The context number is a unique identifier of a context, the context may be obtained by combining multiple threads, and it may be considered that commands executed in order in a same context are in a context dependency.

S102. Use a current time as a target timestamp of the target request.

Specifically, after determining the target context number, the master server may further detect whether the target request carries a preset timestamp. If the master server detects that the target request does not carry the preset timestamp, the master server uses a current time as the target timestamp of the target request, that is, the target command is corresponding to the target timestamp; and then starts to perform steps S103 to S105. By adding a timestamp, commands with a same context number can be executed in strict accordance with a timestamp sequence in subsequent command execution. Alternatively, if the master server detects that the target request carries the preset timestamp, the master server places the target request in a wait queue. When detecting that a time arrives at the preset timestamp, the master server extracts the target request from the wait queue. In this case, the master server may use the preset timestamp as the target timestamp of the target request, and then starts to perform the steps S103 to S105.

Optionally, after determining the target timestamp, the master server may further determine the target request that carries the target timestamp and the target context number as a to-be-processed message, and send the to-be-processed message to the client. After the client receives the to-be-processed message, the client may learn that the target request is handled by the master server. Therefore, after receiving the to-be-processed message, the client may continue to initiate a next request to the master server or another server, so that a response delay of the client can be reduced. After the client receives the to-be-processed message, the client may further send the target context number to an associated client in a same context, so that when sending a request to the master server or another server, the associated client may add the target context number to the request.

S103. Add a local associated command corresponding to the target context number and a local conflicted command corresponding to the target command to a target dependency set.

Specifically, after the master server determines the target timestamp, the master server may first create a dependency set corresponding to the target request, and determine the dependency set as the target dependency set. Then, the master server locally detects a first to-be-processed request that carries a context number equal to the target context number and a timestamp less than the target timestamp, uses a command in the first to-be-processed request as the associated command, and adds the associated command to the target dependency set. Further, the master server locally detects a second to-be-processed request that carries a context number unequal to the target context number and a command in read/write conflict with the target command, uses the command in the second to-be-processed request as the conflicted command, and adds the conflicted command to the target dependency set. The master server detects that a priority of the associated command is higher than that of the conflicted command. If the master server detects that there is only the associated command, the target dependency set includes only the associated command; or if the master server detects that there is only the conflicted command, the target dependency set includes only the conflicted command. Both the associated command and the conflicted command are commands that are received by the master server and that have not been executed.

S104. Forward the target request to a replica server, update the target dependency set according to a feedback from the replica server, and store an updated target dependency set synchronously with the replica server, so that the replica server subsequently executes a command according to the updated target dependency set.

Specifically, after the master server obtains the target dependency set that includes the associated command and the conflicted command, the master server may forward the target request to all replica servers in the cloud computing data center. The replica server further generates a replica dependency set according to the target context number and the target command in the target request. The replica dependency set includes the associated command that is corresponding to the target context number and that is stored in the replica server, and the conflicted command that is corresponding to the target command and that is stored in the replica server. After generating the replica dependency set, the replica server sends the replica dependency set to the master server. The replica dependency set is the feedback from the replica server. In this case, the master server may receive replica dependency sets separately sent by all the replica servers, and compare each replica dependency set with the target dependency set. If a replica dependency set is inconsistent with the target dependency set, the master server adds a redundant associated command and a redundant conflicted command in the inconsistent replica dependency set to the target dependency set, so as to obtain an updated target dependency set. The master server sends the updated target dependency set to all the replica servers, so that all the replica servers synchronously store the updated target dependency set, and send an acknowledgment message to the master server. If a quantity of acknowledgment messages received by the master server reaches a preset quantity threshold, it indicates that most of the replica servers send the acknowledgment message; that is, most of the replica servers work normally. In this case, the master server may submit the target request; that is, the master server has determined the updated target dependency set, and may prepare to perform step S105. The master server further sends a submission request to all the replica servers, so that all the replica servers submit the target request, and prepare to execute the target command in the submitted target request. Optionally, when the master server detects that each received replica dependency set is the same as the target dependency set, the master server does not need to update the target dependency set. In this case, the master server may submit the target request; that is, the master server has determined the target dependency set, and may prepare to perform the step S105. The master server further sends a submission request to all the replica servers, so that all the replica servers submit the target request, and prepare to execute the target command in the submitted target request.

S105. Determine a target execution sequence of the target command and each command in the updated target dependency set according to the target context number and the target timestamp that are corresponding to the target command, and a context number and a timestamp that are corresponding to each command in the updated target dependency set, and execute the target command and each command in the updated target dependency set according to the target execution sequence.

Specifically, a specific process in which the master server submits the target request is: The master server adds the target request to a local to-be-executed request set, and instructs the replica server to add the target request to a to-be-executed request set in the replica server, so that the replica server executes a command according to the updated target dependency set when obtaining the target request from an execution request set in the replica server by means of extraction. When obtaining the target request from the local to-be-executed request set by means of extraction, the master server performs topological sorting on the target command and each command in the updated target dependency set according to the target context number and the target timestamp that are corresponding to the target command, and the context number and the timestamp that are corresponding to each command in the updated target dependency set, and reverses an obtained sequence, so as to obtain a connected graph, where the connected graph includes a topology structure constructed by the target command and each command in the updated target dependency set. For example, commands with a same context number in the connected graph may be sorted in ascending order of timestamps. That is, a command with a smaller timestamp is executed before a command with a larger timestamp is executed. If there are two commands in conflict with each other in the connected graph, and the two commands are corresponding to different context numbers, the two commands may be sorted in ascending order of context numbers, or the two commands may be sorted according to another rule. Optionally, if some commands in the updated target dependency set are corresponding to a dependency set, the master server may add the dependency set corresponding to the commands to the connected graph. The dependency set corresponding to the commands may be referred to as an associated dependency set. The master server may further perform topological sorting on each command in the associated dependency set according to a context number and a timestamp corresponding to each command in the associated dependency set, so as to obtain a topology structure of all commands in the associated dependency set. If a context number corresponding to a command in the associated dependency set is different from a context number corresponding to a command in the updated target dependency set, and the two commands are not conflicted commands, there is no execution sequence between the two commands; that is, the two commands may be simultaneously executed, or may be executed one after the other.

After performing the topological sorting and obtaining the connected graph, the master server may further detect whether the connected graph includes a strongly connected component in a ring structure, a mesh structure, or another structure. If the connected graph includes a strongly connected component, the master server performs unidirectional sorting on the strongly connected component according to a context number and a timestamp of each command in the strongly connected component, so as to obtain a target execution sequence corresponding to all commands in the connected graph. In the unidirectional sorting of the strongly connected component, the sorting may be performed in ascending order of context numbers of all commands in the strongly connected component. If some commands in the strongly connected component have a same context number, the sorting may be further performed in ascending order of timestamps, so as to open up the strongly connected component and ensure that the connected graph no longer includes the strongly connected component. Alternatively, if the master server detects that the connected graph does not include a strongly connected component when detecting whether the connected graph includes a strongly connected component in a ring structure, a mesh structure, or another structure, the master server determines the topological order obtained by means of topological sorting as the target execution sequence.

After the master server determines the target execution sequence, the master server may execute all the commands in the connected graph according to the target execution sequence. When the replica server obtains the target request from the to-be-executed request set in the replica server by means of extraction, a process in which the replica server constructs a connected graph according to the updated target dependency set corresponding to the target request is the same as an execution process of the master server, and details are not described herein again. After determining the connected graph, the replica server may execute all commands in the connected graph according to the target execution sequence. Both the replica server and the master server construct a connected graph according to the updated dependency set. Therefore, the connected graph in the replica server is the same as that in the master server, a command executed by the replica server is the same as that executed by the master server, and an execution sequence followed by the replica server is the same as that followed by the master server, so that server cluster consistency is ensured.

In the present disclosure, different clients may share a same context. Requests in the same context are sorted and executed in strict accordance with times at which the requests arrive at the server. Therefore, the requests in the context are in sequence consistency. In addition, by means of read/write conflict detection, requests that are not in conflict with each other and that are in different contexts may be concurrently executed in any order, and requests in conflict with each other need to be executed according to a specified sequence, so that an execution result of the master server is consistent with execution results of all the replica servers. This not only ensures server consistency, but also ensures a throughput rate and a response speed.

In the present disclosure, processing of upper-layer application requirement consistency (sequence consistency in the context) and server status consistency in an entire system are combined, so that both a high-consistency requirement of an application layer and reliability of the system are ensured. In addition, the client may further predefine the timestamp. The predefined timestamp is a future time. The predefined timestamp may be identified by the server, and a sequence of corresponding requests in the context may be determined by predefining the timestamp. If the timestamp is predefined for a group of requests in a same context, the group of requests are finally executed according to a predefined timestamp sequence, so that a command execution sequence determined by a client is implemented. This avoids unnecessary communication caused by message sending of all servers, and decreases a quantity of messages in the data center.

In this embodiment of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

Figure 2A:
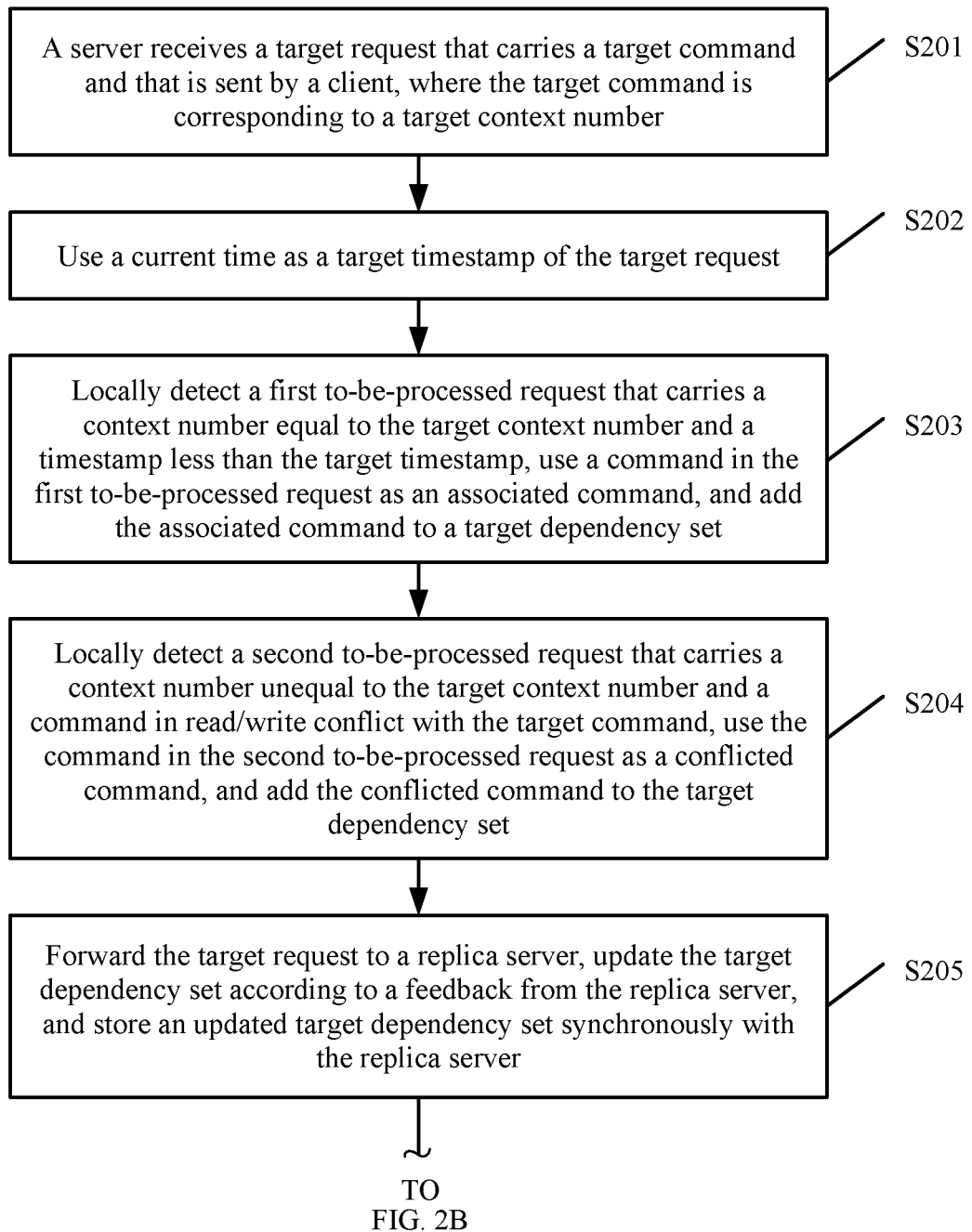
FIG. 2A and FIG. 2B are another schematic flowchart of a command processing method according to an embodiment of the present disclosure.
Figure 2B:
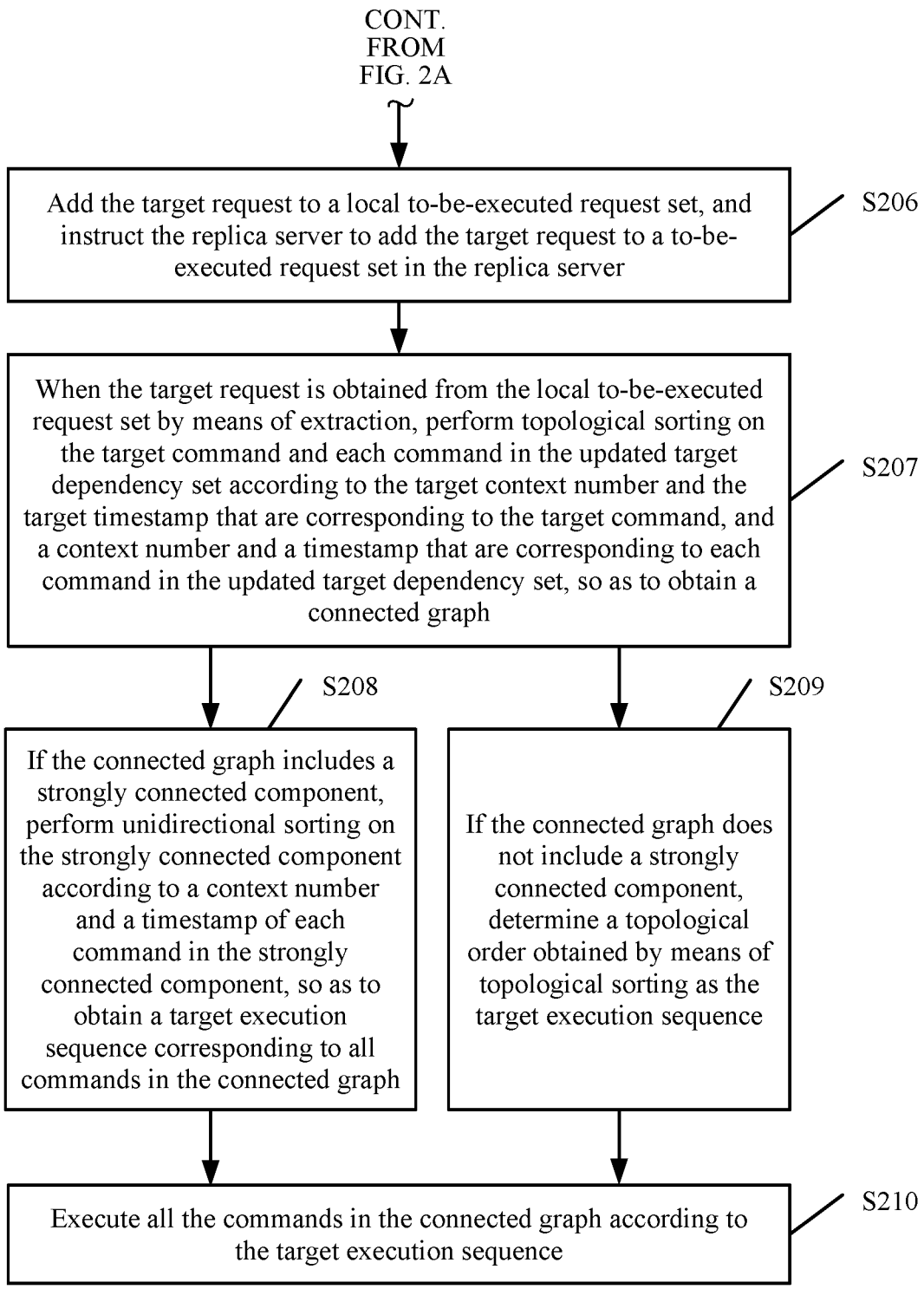

Referring to FIG. 2A and FIG. 2B, FIG. 2A and FIG. 2B are another schematic flowchart of a command processing method according to an embodiment of the present disclosure.

S201. A server receives a target request that carries a target command and that is sent by a client, where the target command is corresponding to a target context number.

Specifically, in a cloud computing data center that includes a server cluster, when a server in the server cluster receives a target request that carries a target command and that is sent by the client, the server may determine the server itself as a master server, and determine another server in the cloud computing data center as a replica server. After receiving the target request, the master server may first detect whether the target request carries a context number. If the master server detects that the target request does not carry a context number, the master server may select a context number corresponding to the client from a context number set maintained by the master server, that is, a context number corresponding to the target command, determine the context number corresponding to the target command as a target context number, and add the target context number to the target request; or if the master server detects that the target request carries a context number, the master server determines the context number carried in the target request as a target context number corresponding to the target command. The context number carried in the target request is pre-obtained by the client from the server. The context number is a unique identifier of a context, the context may be obtained by combining multiple threads, and it may be considered that commands executed in order in a same context are in a context dependency.

S202. Use a current time as a target timestamp of the target request.

Specifically, after determining the target context number, the master server may further detect whether the target request carries a preset timestamp. If the master server detects that the target request does not carry the preset timestamp, the master server uses a current time as the target timestamp of the target request, that is, the target command is corresponding to the target timestamp; and then starts to perform steps S203 to S210. By adding a timestamp, commands with a same context number can be executed in strict accordance with a timestamp sequence in subsequent command execution. Alternatively, if the master server detects that the target request carries the preset timestamp, the master server places the target request in a wait queue. When detecting that a time arrives at the preset timestamp, the master server extracts the target request from the wait queue. In this case, the master server may use the preset timestamp as the target timestamp of the target request. Then the steps S203 to S210 are to be performed. The preset timestamp may be identified by the server. Therefore, a sequence of corresponding requests in the context may be determined by predefining the preset timestamp. If the preset timestamp is predefined for a group of requests in a same context, the group of requests are finally executed according to a preset timestamp sequence, so that a command execution sequence determined by a client is implemented. This avoids unnecessary communication caused by message sending of all servers, and decreases a quantity of messages in the data center.

Optionally, after determining the target timestamp, the master server may further determine the target request that carries the target timestamp and the target context number as a to-be-processed message, and send the to-be-processed message to the client. After the client receives the to-beprocessed message, the client may learn that the target request is handled by the master server. Therefore, after receiving the to-be-processed message, the client may continue to initiate a next request to the master server or another server, so that a response delay of the client can be reduced. After the client receives the to-be-processed message, the client may further send the target context number to an associated client in a same context, so that when sending a request to the master server or another server, the associated client may add the target context number to the request.

S203. Locally detect a first to-be-processed request that carries a context number equal to the target context number and a timestamp less than the target timestamp, use a command in the first to-be-processed request as an associated command, and add the associated command to a target dependency set.

Specifically, after the master server determines the target timestamp, the master server may first create a dependency set corresponding to the target request, and determine the dependency set as the target dependency set. Then, the master server locally detects a first to-be-processed request that carries a context number equal to the target context number and a timestamp less than the target timestamp, uses a command in the first to-be-processed request as the associated command, and adds the associated command to the target dependency set. For example, the master server locally stores four requests: a request A, a request B, a request C, and a request D. If the target context number carried in the target request is X, context numbers carried in the request A, the request B, and the request C are all X, and a context number carried in the request D is Y, the master server compares only timestamps separately carried in the request A, the request B, and the request C with the target timestamp carried in the target request. If it is detected that timestamps of the request A and the request B are less than the target timestamp, and a timestamp of the request C is greater than the target timestamp, the master server adds the request A and the request B to the target dependency set.

S204. Locally detect a second to-be-processed request that carries a context number unequal to the target context number and a command in read/write conflict with the target command, use the command in the second to-be-processed request as a conflicted command, and add the conflicted command to the target dependency set.

Specifically, after the master server adds the associated command to the target dependency set, the master server further locally detects a second to-be-processed request that carries a context number unequal to the target context number and a command in read/write conflict with the target command, uses the command in the second to-be-processed request as the conflicted command, and adds the conflicted command to the target dependency set.

The master server detects that a priority of the associated command is higher than that of the conflicted command. If the master server detects that there is only the associated command, the target dependency set includes only the associated command; or if the master server detects that there is only the conflicted command, the target dependency set includes only the conflicted command. Both the associated command and the conflicted command are commands that are received by the master server and that have not been executed.

S205. Forward the target request to a replica server, update the target dependency set according to a feedback from the replica server, and store an updated target dependency set synchronously with the replica server.

Specifically, after the master server obtains the target dependency set that includes the associated command and the conflicted command, the master server may forward the target request to all replica servers in the cloud computing data center. The replica server further generates a replica dependency set according to the target context number and the target command in the target request. The replica dependency set includes the associated command that is corresponding to the target context number and that is stored in the replica server, and the conflicted command that is corresponding to the target command and that is stored in the replica server. After generating the replica dependency set, the replica server sends the replica dependency set to the master server. The replica dependency set is the feedback from the replica server. In this case, the master server may receive replica dependency sets separately sent by all the replica servers, and compare each replica dependency set with the target dependency set. If a replica dependency set is inconsistent with the target dependency set, the master server adds a redundant associated command and a redundant conflicted command in the inconsistent replica dependency set to the target dependency set, so as to obtain an updated target dependency set. The master server sends the updated target dependency set to all the replica servers, so that all the replica servers synchronously store the updated target dependency set, and send an acknowledgment message to the master server. If a quantity of acknowledgment messages received by the master server reaches a preset quantity threshold, it indicates that most of the replica servers send the acknowledgment message; that is, most of the replica servers work normally. In this case, the master server may submit the target request, that is, start to perform step S206. Optionally, when the master server detects that each received replica dependency set is the same as the target dependency set, the master server does not need to update the target dependency set. In this case, the master server may directly submit the target request.

S206. Add the target request to a local to-be-executed request set, and instruct the replica server to add the target request to a to-be-executed request set in the replica server.

Specifically, after storing the updated target dependency set, the master server may submit the target request, that is, add the target request to the local to-be-executed request set. In addition, the master server further instructs the replica server to add the target request to the to-be-executed request set in the replica server, so that the replica server executes a command according to the updated target dependency set when obtaining the target request from an execution request set in the replica server by means of extraction. A specific process in which the replica server executes a command according to the updated target dependency set when obtaining the target request from the execution request set in the replica server by means of extraction is the same as the following steps S207 to S210.

S207. When the target request is obtained from the local to-be-executed request set by means of extraction, perform topological sorting on the target command and each command in the updated target dependency set according to the target context number and the target timestamp that are corresponding to the target command, and a context number and a timestamp that are corresponding to each command in the updated target dependency set, so as to obtain a connected graph.

Specifically, when obtaining the target request from the local to-be-executed request set by means of extraction, the master server performs the topological sorting on the target command and each command in the updated target dependency set according to the target context number and the target timestamp that are corresponding to the target command, and the context number and the timestamp that are corresponding to each command in the updated target dependency set, and reverses an obtained sequence, so as to obtain a connected graph, where the connected graph includes a topology structure constructed by the target command and each command in the updated target dependency set. For example, commands with a same context number in the connected graph may be sorted in ascending order of timestamps. That is, a command with a smaller timestamp is executed before a command with a larger timestamp is executed. If there are two commands in conflict with each other in the connected graph, and the two commands are corresponding to different context numbers, the two commands may be sorted in ascending order of context numbers, or the two commands may be sorted according to another rule. Optionally, if some commands in the updated target dependency set are corresponding to a dependency set, the master server may add the dependency set corresponding to the commands to the connected graph. The dependency set corresponding to the commands may be referred to as an associated dependency set. The master server may further perform topological sorting on each command in the associated dependency set according to a context number and a timestamp corresponding to each command in the associated dependency set, so as to obtain a topology structure of all commands in the associated dependency set. If a context number corresponding to a command in the associated dependency set is different from a context number corresponding to a command in the updated target dependency set, and the two commands are not conflicted commands, there is no execution sequence between the two commands; that is, the two commands may be simultaneously executed, or may be executed one after the other.

S208. If the connected graph includes a strongly connected component, perform unidirectional sorting on the strongly connected component according to a context number and a timestamp of each command in the strongly connected component, so as to obtain a target execution sequence corresponding to all commands in the connected graph.

S209. If the connected graph does not include a strongly connected component, determine the topological order obtained by means of topological sorting as the target execution sequence.

Specifically, after performing the topological sorting and obtaining the connected graph, the master server may further detect whether the connected graph includes a strongly connected component in a ring structure, a mesh structure, or another structure. If the connected graph includes a strongly connected component, the master server performs unidirectional sorting on the strongly connected component according to a context number and a timestamp of each command in the strongly connected component, so as to obtain a target execution sequence corresponding to all commands in the connected graph. In the unidirectional sorting of the strongly connected component, the sorting may be performed in ascending order of context numbers of all commands in the strongly connected component. If some commands in the strongly connected component have a same context number, the sorting may be further performed in ascending order of timestamps, so as to open up the strongly connected component and ensure that the connected graph no longer includes the strongly connected component. Alternatively, if the master server detects that the connected graph does not include a strongly connected component when detecting whether the connected graph includes a strongly connected component in a ring structure, a mesh structure, or another structure, the master server determines the topological order obtained by means of topological sorting as the target execution sequence.

S210. Execute all the commands in the connected graph according to the target execution sequence.

Specifically, after the master server determines the target execution sequence, the master server may execute all the commands in the connected graph according to the target execution sequence. When the replica server obtains the target request from the to-be-executed request set in the replica server by means of extraction, a process in which the replica server constructs a connected graph according to the updated target dependency set corresponding to the target request is the same as an execution process of the master server, and details are not described herein again. After determining the connected graph, the replica server may execute all commands in the connected graph according to the target execution sequence. Both the replica server and the master server construct a connected graph according to the updated dependency set. Therefore, the connected graph in the replica server is the same as that in the master server, a command executed by the replica server is the same as that executed by the master server, and an execution sequence followed by the replica server is the same as that followed by the master server, so that server cluster consistency is ensured.

Figure 3:
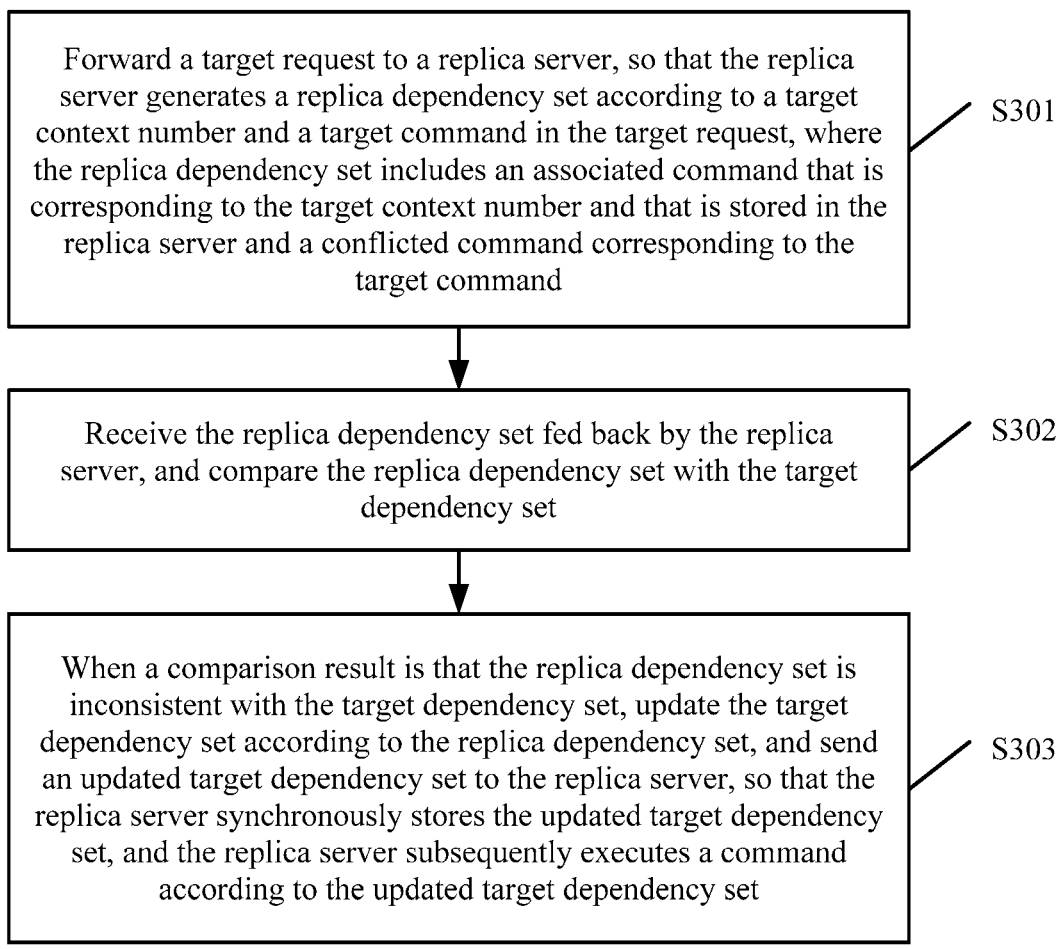
FIG. 3 is a schematic flowchart of a dependency set updating method according to an embodiment of the present disclosure.

Further, referring to FIG. 3, FIG. 3 is a schematic flowchart of a dependency set updating method according to an embodiment of the present disclosure. The method in this embodiment of the present disclosure may be corresponding to S205 in the embodiment corresponding to FIG. 2A and FIG. 2B. The method in this embodiment of the present disclosure specifically includes the following steps.

S301. Forward the target request to a replica server, so that the replica server generates a replica dependency set according to the target context number and the target command in the target request, where the replica dependency set includes an associated command that is corresponding to the target context number and that is stored in the replica server and a conflicted command corresponding to the target command.

Specifically, after the replica server receives the target request, the replica server may first create a dependency set corresponding to the target request, and determine the dependency set as the replica dependency set. Then, the replica server locally detects a first to-be-processed request that carries a context number equal to the target context number and a timestamp less than the target timestamp, uses a command in the first to-be-processed request as the associated command, and adds the associated command to the replica dependency set. Further, the replica server locally detects a second to-be-processed request that carries a context number unequal to the target context number and a command in read/write conflict with the target command, uses the command in the second to-be-processed request as the conflicted command, and adds the conflicted command to the replica dependency set.

S302. Receive the replica dependency set fed back by the replica server, and compare the replica dependency set with the target dependency set.

Specifically, after all replica servers in a cloud computing data center separately generate a replica dependency set that includes the associated command and the conflicted command, the master server may receive replica dependency sets separately sent by all the replica servers, and separately compare all the replica dependency sets with the target dependency set.

S303. When a comparison result is that the replica dependency set is inconsistent with the target dependency set, update the target dependency set according to the replica dependency set, and send an updated target dependency set to the replica server, so that the replica server synchronously stores the updated target dependency set, and the replica server subsequently executes a command according to the updated target dependency set.

Specifically, if a replica dependency set is inconsistent with the target dependency set, the master server adds a redundant associated command and a redundant conflicted command in the inconsistent replica dependency set to the target dependency set, so as to obtain an updated target dependency set. The master server sends the updated target dependency set to all the replica servers, so that all the replica servers synchronously store the updated target dependency set, and send an acknowledgment message to the master server. If a quantity of acknowledgment messages received by the master server reaches a preset quantity threshold, it indicates that most of the replica servers send the acknowledgment message; that is, most of the replica servers work normally. In this case, the master server may submit the target request; that is, the master server has determined the updated target dependency set. The master server further sends a submission request to all the replica servers, so that all the replica servers submit the target request, and prepare to execute the target command in the submitted target request. Optionally, when the master server detects that each received replica dependency set is the same as the target dependency set, the master server does not need to update the target dependency set. In this case, the master server may submit the target request; that is, the master server has determined the target dependency set. The master server further sends a submission request to all the replica servers, so that all the replica servers submit the target request, and prepare to execute the target command in the submitted target request.

In this embodiment of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

Figure 4:
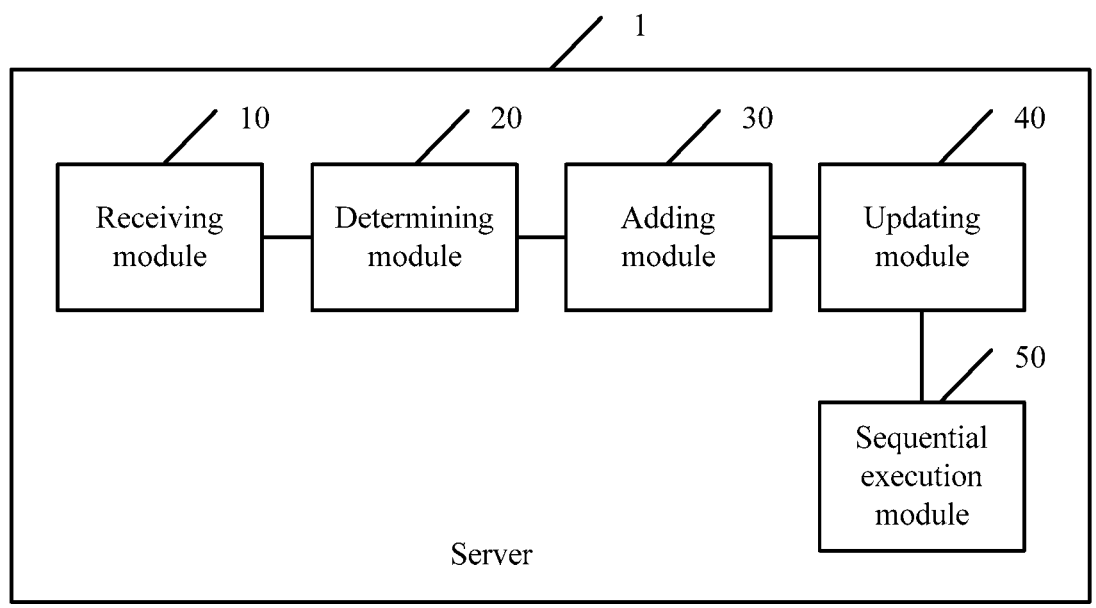
FIG. 4 is a schematic structural diagram of a server according to an embodiment of the present disclosure.

Referring to FIG. 4, FIG. 4 is a schematic structural diagram of a server according to an embodiment of the present disclosure. The server 1 may include: a receiving module 10, a determining module 20, an adding module 30, an updating module 40, and a sequential execution module 50.

The receiving module 10 is configured to receive a target request that carries a target command and that is sent by a client, where the target command is corresponding to a target context number.

Specifically, in a cloud computing data center that includes a server cluster, when the receiving module 10 in a server 1 in the server cluster receives a target request that carries a target command and that is sent by the client, the server 1 may determine the server itself as a master server, and determine another server in the cloud computing data center as a replica server. The target command in the target request received by the receiving module 10 may be corresponding to a target context number. The target context number in the target request may be pre-obtained by the client from the server 1. The context number is a unique identifier of a context, the context may be obtained by combining multiple threads, and it may be considered that commands executed in order in a same context are in a context dependency.

The determining module 20 is configured to use a current time as a target timestamp of the target request.

Specifically, after the target request is received, the determining module 20 may detect whether the target request carries a preset timestamp. If the determining module 20 detects that the target request does not carry the preset timestamp, the determining module 20 uses a current time as the target timestamp of the target request; that is, the target command is corresponding to the target timestamp. By adding a timestamp, commands with a same context number can be executed in strict accordance with a timestamp sequence in subsequent command execution. Alternatively, if the determining module 20 detects that the target request carries the preset timestamp, the determining module 20 places the target request in a wait queue. When detecting that a time arrives at the preset timestamp, the determining module 20 extracts the target request from the wait queue. In this case, the determining module 20 may use the preset timestamp as the target timestamp of the target request.

The adding module 30 is configured to add a local associated command corresponding to the target context number and a local conflicted command corresponding to the target command to a target dependency set.

Specifically, after the determining module 20 determines the target timestamp, the adding module 30 may first create a dependency set corresponding to the target request, and determine the dependency set as the target dependency set. Then, the adding module 30 locally detects a first to-be-processed request that carries a context number equal to the target context number and a timestamp less than the target timestamp, uses a command in the first to-be-processed request as the associated command, and adds the associated command to the target dependency set. Further, the adding module 30 locally detects a second to-be-processed request that carries a context number unequal to the target context number and a command in read/write conflict with the target command, uses the command in the second to-be-processed request as the conflicted command, and adds the conflicted command to the target dependency set. The master server detects that a priority of the associated command is higher than that of the conflicted command. If the master server detects that there is only the associated command, the target dependency set includes only the associated command; or if the master server detects that there is only the conflicted command, the target dependency set includes only the conflicted command. Both the associated command and the conflicted command are commands that are received by the master server and that have not been executed.

The updating module 40 is configured to forward the target request to a replica server, update the target dependency set according to a feedback from the replica server, and store an updated target dependency set synchronously with the replica server, so that the replica server subsequently executes a command according to the updated target dependency set.

Specifically, after the target dependency set that includes the associated command and the conflicted command is obtained, the updating module 40 may forward the target request to all replica servers in the cloud computing data center. The replica server further generates a replica dependency set according to the target context number and the target command in the target request. The replica dependency set includes the associated command that is corresponding to the target context number and that is stored in the replica server, and the conflicted command that is corresponding to the target command and that is stored in the replica server. After generating the replica dependency set, the replica server sends the replica dependency set to the master server. The replica dependency set is the feedback from the replica server. In this case, the updating module 40 may receive replica dependency sets separately sent by all the replica servers, and compare each replica dependency set with the target dependency set. If a replica dependency set is inconsistent with the target dependency set, the updating module 40 adds a redundant associated command and a redundant conflicted command in the inconsistent replica dependency set to the target dependency set, so as to obtain an updated target dependency set. The updating module 40 sends the updated target dependency set to all the replica servers, so that all the replica servers synchronously store the updated target dependency set, and the replica servers subsequently execute a command according to the updated target dependency set. Optionally, when the updating module 40 detects that each received replica dependency set is the same as the target dependency set, the updating module 40 does not need to update the target dependency set. In this case, the updating module 40 and all the replica servers synchronously store the target dependency set directly.

The sequential execution module 50 is configured to determine a target execution sequence of the target command and each command in the updated target dependency set according to the target context number and the target timestamp that are corresponding to the target command, and a context number and a timestamp that are corresponding to each command in the updated target dependency set, and execute the target command and each command in the updated target dependency set according to the target execution sequence.

Specifically, after the updated target dependency set is stored, all the replica servers may send an acknowledgment message to the master server. If a quantity of acknowledgment messages received by the sequential execution module 50 reaches a preset quantity threshold, it indicates that most of the replica servers send the acknowledgment message; that is, most of the replica servers work normally. In this case, the sequential execution module 50 may submit the target request. The sequential execution module 50 further sends a submission request to all the replica servers, so that all the replica servers submit the target request, and prepare to execute the target command in the submitted target request.

Specifically, a specific process in which the sequential execution module 50 submits the target request is: The sequential execution module 50 adds the target request to a local to-be-executed request set, and instructs the replica server to add the target request to a to-be-executed request set in the replica server, so that the replica server executes a command according to the updated target dependency set when obtaining the target request from an execution request set in the replica server by means of extraction. When obtaining the target request from the local to-be-executed request set by means of extraction, the sequential execution module 50 performs topological sorting on the target command and each command in the updated target dependency set according to the target context number and the target timestamp that are corresponding to the target command, and the context number and the timestamp that are corresponding to each command in the updated target dependency set, and reverses an obtained sequence, so as to obtain a connected graph, where the connected graph includes a topology structure constructed by the target command and each command in the updated target dependency set. For example, commands with a same context number in the connected graph may be sorted in ascending order of timestamps. That is, a command with a smaller timestamp is executed before a command with a larger timestamp is executed. If there are two commands in conflict with each other in the connected graph, and the two commands are corresponding to different context numbers, the two commands may be sorted in ascending order of context numbers, or the two commands may be sorted according to another rule. Optionally, if some commands in the updated target dependency set are corresponding to a dependency set, the sequential execution module 50 may add the dependency set corresponding to the commands to the connected graph. The dependency set corresponding to the commands may be referred to as an associated dependency set. The sequential execution module 50 may further perform topological sorting on each command in the associated dependency set according to a context number and a timestamp corresponding to each command in the associated dependency set, so as to obtain a topology structure of all commands in the associated dependency set. If a context number corresponding to a command in the associated dependency set is different from a context number corresponding to a command in the updated target dependency set, and the two commands are not conflicted commands, there is no execution sequence between the two commands; that is, the two commands may be simultaneously executed, or may be executed one after the other.

After performing the topological sorting and obtaining the connected graph, the sequential execution module 50 may further detect whether the connected graph includes a strongly connected component in a ring structure, a mesh structure, or another structure. If the connected graph includes a strongly connected component, the sequential execution module 50 performs unidirectional sorting on the strongly connected component according to a context number and a timestamp of each command in the strongly connected component, so as to obtain a target execution sequence corresponding to all commands in the connected graph. In the unidirectional sorting of the strongly connected component, the sorting may be performed in ascending order of context numbers of all commands in the strongly connected component. If some commands in the strongly connected component have a same context number, the sorting may be further performed in ascending order of timestamps, so as to open up the strongly connected component and ensure that the connected graph no longer includes the strongly connected component. Alternatively, if the sequential execution module 50 detects that the connected graph does not include a strongly connected component when detecting whether the connected graph includes a strongly connected component in a ring structure, a mesh structure, or another structure, the sequential execution module 50 determines the topological order obtained by means of topological sorting as the target execution sequence.

After the sequential execution module 50 determines the target execution sequence, the sequential execution module 50 may execute all the commands in the connected graph according to the target execution sequence. When the replica server obtains the target request from the to-be-executed request set in the replica server by means of extraction, a process in which the replica server constructs a connected graph according to the updated target dependency set corresponding to the target request is the same as an execution process of the sequential execution module 50, and details are not described herein again. After determining the connected graph, the replica server may execute all commands in the connected graph according to the target execution sequence. Both the replica server and the master server construct a connected graph according to the updated dependency set. Therefore, the connected graph in the replica server is the same as that in the master server, a command executed by the replica server is the same as that executed by the master server, and an execution sequence followed by the replica server is the same as that followed by the master server, so that server cluster consistency is ensured.

Figure 5:
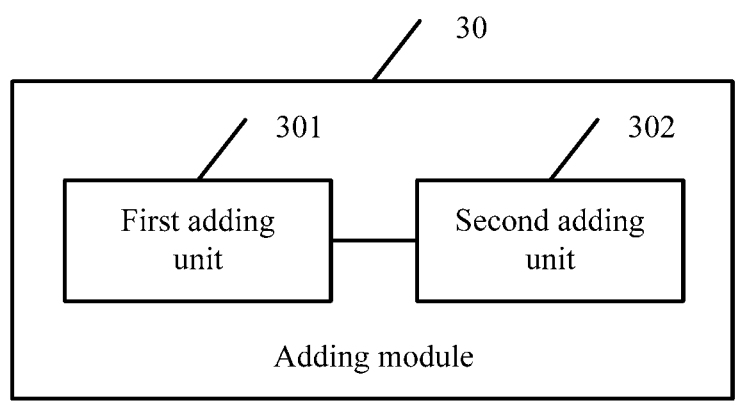
FIG. 5 is a schematic structural diagram of an adding module according to an embodiment of the present disclosure.

Further, referring to FIG. 5, FIG. 5 is a schematic structural diagram of an adding module 30 according to an embodiment of the present disclosure. The adding module 30 may include: a first adding unit 301 and a second adding unit 302.

The first adding unit 301 is configured to locally detect a first to-be-processed request that carries a context number equal to the target context number and a timestamp less than the target timestamp, use a command in the first to-be-processed request as the associated command, and add the associated command to the target dependency set.

Specifically, after the target timestamp is determined, the first adding unit 301 may first create a dependency set corresponding to the target request, and determine the dependency set as the target dependency set. Then, the first adding unit 301 locally detects a first to-be-processed request that carries a context number equal to the target context number and a timestamp less than the target timestamp, uses a command in the first to-be-processed request as the associated command, and adds the associated command to the target dependency set. For example, the master server locally stores four requests: a request A, a request B, a request C, and a request D. If the target context number carried in the target request is X, context numbers carried in the request A, the request B, and the request C are all X, and a context number carried in the request D is Y, the first adding unit 301 compares only timestamps separately carried in the request A, the request B, and the request C with the target timestamp carried in the target request. If it is detected that timestamps of the request A and the request B are less than the target timestamp, and a timestamp of the request C is greater than the target timestamp, the dependency set adding unit adds the request A and the request B to the target dependency set.

The second adding unit 302 is configured to locally detect a second to-be-processed request that carries a context number unequal to the target context number and a command in read/write conflict with the target command, use the command in the second to-be-processed request as the conflicted command, and add the conflicted command to the target dependency set.

Specifically, after the first adding unit 301 adds the associated command to the target dependency set, the second adding unit 302 may further locally detect a second to-be-processed request that carries a context number unequal to the target context number and a command in read/write conflict with the target command, use the command in the second to-be-processed request as the conflicted command, and add the conflicted command to the target dependency set.

Figure 6:
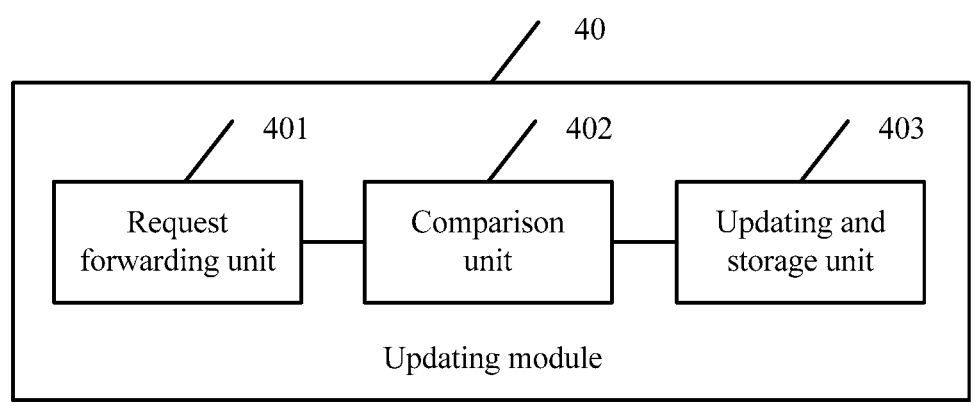
FIG. 6 is a schematic structural diagram of an updating module according to an embodiment of the present disclosure.

Further, referring to FIG. 6, FIG. 6 is a schematic structural diagram of an updating module 40 according to an embodiment of the present disclosure. The updating module 40 may include: a request forwarding unit 401, a comparison unit 402, and an updating and storage unit 403.

The request forwarding unit 401 is configured to forward the target request to the replica server, so that the replica server generates a replica dependency set according to the target context number and the target command in the target request, where the replica dependency set includes the associated command that is corresponding to the target context number and that is stored in the replica server and the conflicted command corresponding to the target command.

Specifically, after the request forwarding unit 401 forwards the target request to the replica server, the replica server may first create a dependency set corresponding to the target request. The replica server further determines the dependency set as the replica dependency set. Then, the replica server locally detects a first to-be-processed request that carries a context number equal to the target context number and a timestamp less than the target timestamp, uses a command in the first to-be-processed request as the associated command, and adds the associated command to the replica dependency set. Further, the replica server detects, in the replica server, a second to-be-processed request that carries a context number unequal to the target context number and a command in read/write conflict with the target command, uses the command in the second to-be-processed request as the conflicted command, and adds the conflicted command to the replica dependency set.

The comparison unit 402 is configured to receive the replica dependency set fed back by the replica server, and compare the replica dependency set with the target dependency set.

Specifically, after all the replica servers in the cloud computing data center separately generate a replica dependency set that includes the associated command and the conflicted command, the comparison unit 402 may receive replica dependency sets separately sent by all the replica servers, and separately compare all the replica dependency sets with the target dependency set.

The updating and storage unit 403 is configured to: when a comparison result is that the replica dependency set is inconsistent with the target dependency set, update the target dependency set according to the replica dependency set, and send an updated target dependency set to the replica server, so that the updating and storage unit 403 and the replica server synchronously store the updated target dependency set, and the replica server subsequently executes a command according to the updated target dependency set.

Specifically, if a replica dependency set is inconsistent with the target dependency set, the updating and storage unit 403 adds a redundant associated command and a redundant conflicted command in the inconsistent replica dependency set to the target dependency set, so as to obtain an updated target dependency set. The updating and storage unit 403 sends the updated target dependency set to all the replica servers, so that all the replica servers synchronously store the updated target dependency set, and send an acknowledgment message to the master server. If a quantity of acknowledgment messages received by the updating and storage unit 403 reaches a preset quantity threshold, it indicates that most of the replica servers send the acknowledgment message; that is, most of the replica servers work normally. In this case, the master server may submit the target request; that is, the master server has determined the updated target dependency set. The master server further sends a submission request to all the replica servers, so that all the replica servers submit the target request, and prepare to execute the target command in the submitted target request. Optionally, when the updating and storage unit 403 detects that each received replica dependency set is the same as the target dependency set, the updating and storage unit 403 does not need to update the target dependency set, and directly instructs all the replica servers to synchronously store the target dependency set.

Figure 7:
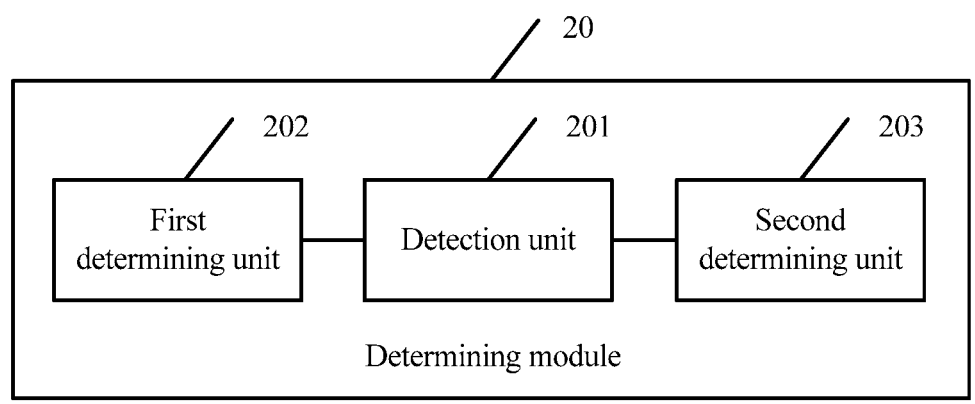
FIG. 7 is a schematic structural diagram of a determining module according to an embodiment of the present disclosure.

Further, referring to FIG. 7, FIG. 7 is a schematic structural diagram of a determining module 20 according to an embodiment of the present disclosure. The determining module 20 may include: a detection unit 201, a first determining unit 202, and a second determining unit 203.

The detection unit 201 is configured to detect whether the target request includes a preset timestamp.

The first determining unit 202 is configured to: if the detection unit 201 detects that the target request does not include the preset timestamp, use the current time as the target timestamp of the target request.

The second determining unit 203 is configured to: if the detection unit 201 detects that the target request includes the preset timestamp, add the target request to a wait queue; and when the detection unit 201 detects that a time arrives at the preset timestamp, extract the target request from the wait queue, and use the preset timestamp in the target request as the target timestamp of the target request.

Specifically, if the detection unit 201 detects that the target request includes the preset timestamp, the second determining unit 203 adds the target request to a wait queue. When the detection unit 201 detects that a time arrives at the preset timestamp, the second determining unit 203 extracts the target request from the wait queue, and determines the preset timestamp in the target request as the target timestamp. The preset timestamp may be identified by the server 1. Therefore, a sequence of corresponding requests in the context may be determined by predefining the preset timestamp. If the preset timestamp is predefined for a group of requests in a same context, the group of requests are finally executed according to a preset timestamp sequence, so that a command execution sequence determined by a client is implemented. This avoids unnecessary communication caused by message sending of all servers, and decreases a quantity of messages in the data center.

Figure 8:
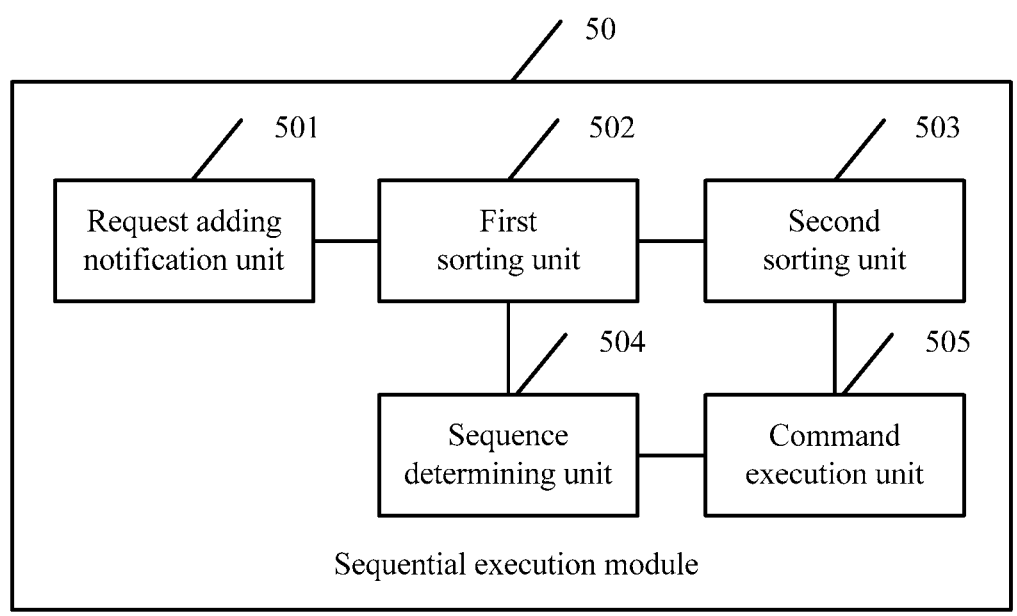
FIG. 8 is a schematic structural diagram of a sequential execution module according to an embodiment of the present disclosure.

Further, referring to FIG. 8, FIG. 8 is a schematic structural diagram of a sequential execution module 50 according to an embodiment of the present disclosure. The sequential execution module 50 may include: a request adding notification unit 501, a first sorting unit 502, a second sorting unit 503, a sequence determining unit 504, and a command execution unit 505.

The request adding notification unit 501 is configured to: add the target request to a local to-be-executed request set, and instruct the replica server to add the target request to a to-be-executed request set in the replica server, so that the replica server executes a command according to the updated target dependency set when obtaining the target request from an execution request set in the replica server by means of extraction.

Specifically, after the updated target dependency set is stored, the request adding notification unit 501 may submit the target request, that is, add the target request to the local to-be-executed request set. In addition, the request adding notification unit 501 further instructs the replica server to add the target request to the to-be-executed request set in the replica server, so that the replica server executes a command according to the updated target dependency set when obtaining the target request from the execution request set in the replica server by means of extraction. A specific process in which the replica server executes a command according to the updated target dependency set when obtaining the target request from the execution request set in the replica server by means of extraction is the same as an operation process performed by the first sorting unit 502, the second sorting unit 503, and the command execution unit 505.

The first sorting unit 502 is configured to: when the target request is obtained from the local to-be-executed request set by means of extraction, perform topological sorting on the target command and each command in the updated target dependency set according to the target context number and the target timestamp that are corresponding to the target command, and the context number and the timestamp that are corresponding to each command in the updated target dependency set, so as to obtain a connected graph, where the connected graph includes a topology structure constructed by the target command and each command in the updated target dependency set.

Specifically, when the first sorting unit 502 obtains the target request from the local to-be-executed request set by means of extraction, the first sorting unit 502 performs the topological sorting on the target command and each command in the updated target dependency set according to the target context number and the target timestamp that are corresponding to the target command, and the context number and the timestamp that are corresponding to each command in the updated target dependency set, and reverses an obtained sequence, so as to obtain a connected graph, where the connected graph includes a topology structure constructed by the target command and each command in the updated target dependency set. For example, commands with a same context number in the connected graph may be sorted in ascending order of timestamps. That is, a command with a smaller timestamp is executed before a command with a larger timestamp is executed. If there are two commands in conflict with each other in the connected graph, and the two commands are corresponding to different context numbers, the two commands may be sorted in ascending order of context numbers, or the two commands may be sorted according to another rule. Optionally, if some commands in the updated target dependency set are corresponding to a dependency set, the first sorting unit 502 may add the dependency set corresponding to the commands to the connected graph. The dependency set corresponding to the commands may be referred to as an associated dependency set. The first sorting unit 502 may further perform topological sorting on each command in the associated dependency set according to a context number and a timestamp corresponding to each command in the associated dependency set, so as to obtain a topology structure of all commands in the associated dependency set. If a context number corresponding to a command in the associated dependency set is different from a context number corresponding to a command in the updated target dependency set, and the two commands are not conflicted commands, there is no execution sequence between the two commands; that is, the two commands may be simultaneously executed, or may be executed one after the other.

The second sorting unit 503 is configured to: if the connected graph includes a strongly connected component, perform unidirectional sorting on the strongly connected component according to a context number and a timestamp of each command in the strongly connected component, so as to obtain a target execution sequence corresponding to all commands in the connected graph.

The sequence determining unit 504 is configured to: if the connected graph does not include a strongly connected component, determine the topological order obtained by means of topological sorting as the target execution sequence.

Specifically, after the first sorting unit 502 performs the topological sorting and obtains the connected graph, the first sorting unit 502 may further detect whether the connected graph includes a strongly connected component in a ring structure, a mesh structure, or another structure. When the first sorting unit 502 detects that the connected graph includes a strongly connected component, the second sorting unit 503 performs unidirectional sorting on the strongly connected component according to a context number and a timestamp of each command in the strongly connected component, so as to obtain a target execution sequence corresponding to all commands in the connected graph. In the unidirectional sorting of the strongly connected component, the second sorting unit 503 may perform the sorting in ascending order of context numbers of all commands in the strongly connected component. If some commands in the strongly connected component have a same context number, the second sorting unit 503 may further perform the sorting in ascending order of timestamps, so as to open up the strongly connected component and ensure that the connected graph no longer includes the strongly connected component. Alternatively, if the first sorting unit 502 detects that the connected graph does not include a strongly connected component when detecting whether the connected graph includes a strongly connected component in a ring structure, a mesh structure, or another structure, the sequence determining unit 504 determines the topological order obtained by means of topological sorting as the target execution sequence.

The command execution unit 505 is configured to execute all the commands in the connected graph according to the target execution sequence.

Specifically, after the target execution sequence is determined, the command execution unit 505 may execute all the commands in the connected graph according to the target execution sequence. When the replica server obtains the target request from the to-be-executed request set in the replica server by means of extraction, a process in which the replica server constructs a connected graph according to the updated target dependency set corresponding to the target request is the same as an execution process of the master server, and details are not described herein again. After determining the connected graph, the replica server may execute all commands in the connected graph according to the target execution sequence. Both the replica server and the master server construct a connected graph according to the updated dependency set. Therefore, the connected graph in the replica server is the same as that in the master server, a command executed by the replica server is the same as that executed by the master server, and an execution sequence followed by the replica server is the same as that followed by the master server, so that server cluster consistency is ensured.

In the present disclosure, different clients may share a same context. Requests in the same context are sorted and executed in strict accordance with times at which the requests arrive at the server 1. Therefore, the requests in the context are in sequence consistency. In addition, by means of read/write conflict detection, requests that are not in conflict with each other and that are in different contexts may be concurrently executed in any order, and requests in conflict with each other need to be executed according to a specified sequence, so that an execution result of the master server is consistent with execution results of all the replica servers. This not only ensures server consistency, but also ensures a throughput rate and a response speed.

In this embodiment of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

Figure 9:
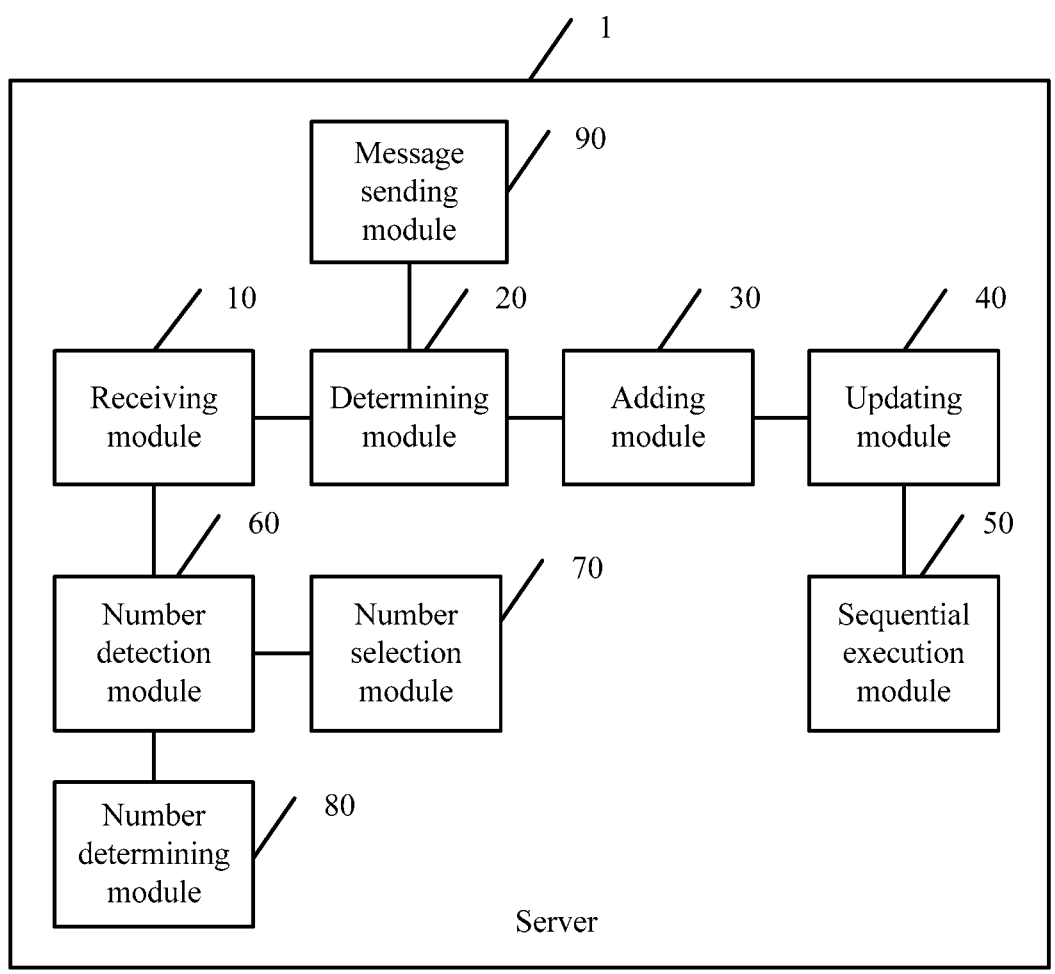
FIG. 9 is another schematic structural diagram of a server according to an embodiment of the present disclosure.

Referring to FIG. 9, FIG. 9 is another schematic structural diagram of a server according to an embodiment of the present disclosure. The server 1 may include the receiving module 10, the determining module 20, the adding module 30, the updating module 40, and the sequential execution module 50 in the embodiment corresponding to FIG. 4. The server 1 may further include: a number detection module 60, a number selection module 70, a number determining module 80, and a message sending module 90.

The number detection module 60 is configured to detect whether the target request carries a context number.

Specifically, after the receiving module 10 receives the target request that carries the target command and that is sent by the client, the number detection module 60 may detect whether the target request carries a context number. The context number is a unique identifier of a context, the context may be obtained by combining multiple threads, and it may be considered that commands executed in order in a same context are in a context dependency.

The number selection module 70 is configured to: if the number detection module 60 detects that the target request does not carry a context number, select a target context number corresponding to the target command from a locally maintained context number set, and add the target context number to the target request.

The number determining module 80 is configured to: if the number detection module 60 detects that the target request carries a context number, determine the carried context number as the target context number corresponding to the target command.

The context number carried in the target request is pre-obtained by the client from the server 1.

The message sending module 90 is configured to: determine the target request that carries the target timestamp and the target context number as a to-be-processed message, and send the to-be-processed message to the client, so that the client initiates a next request, or sends the target context number to an associated client in a same context.

Specifically, after the target timestamp and the target context number are determined, the message sending module 90 may determine the target request that carries the target timestamp and the target context number as a to-be-processed message, and send the to-be-processed message to the client. After the client receives the to-be-processed message, the client may learn that the target request is handled by the master server. Therefore, after receiving the to-be-processed message, the client may continue to initiate a next request to the master server or another server, so that a response delay of the client can be reduced. After the client receives the to-be-processed message, the client may further send the target context number to an associated client in a same context, so that when sending a request to the master server or another server, the associated client may add the target context number to the request.

In this embodiment of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

Figure 10:
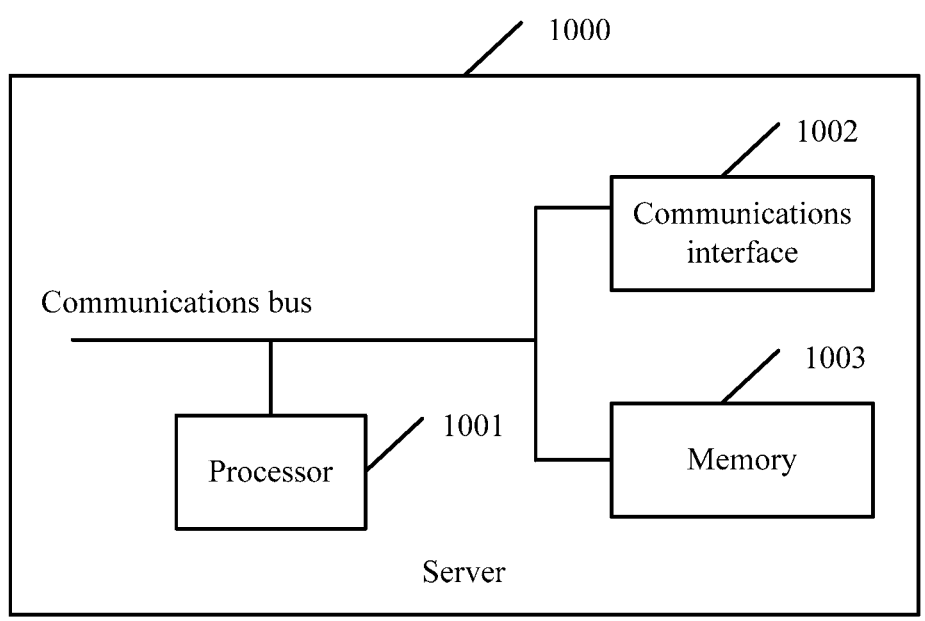
FIG. 10 is still another schematic structural diagram of a server according to an embodiment of the present disclosure.

Referring to FIG. 10, FIG. 10 is still another schematic structural diagram of a server according to an embodiment of the present disclosure. The server 1000 may include: a processor 1001, a communications interface 1002, and a memory 1003 (There may be one or more processors 1001 in the server 1000, and one processor 1001 is used as an example in FIG. 10). In some embodiments of the present disclosure, the processor 1001, the communications interface 1002, and the memory 1003 may be connected by using a communications bus or in another manner. An example in which the connection is performed by using the communications bus is used in FIG. 10.

The communications interface 1002 is configured to communicate with a client and a replica server.

The memory 1003 is configured to store a program.

The processor 1001 is configured to execute the program, so as to:

receive a target request that carries a target command and that is sent by the client, where the target command is corresponding to a target context number;

use a current time as a target timestamp of the target request;

add a local associated command corresponding to the target context number and a local conflicted command corresponding to the target command to a target dependency set;

forward the target request to the replica server, update the target dependency set according to a feedback from the replica server, and store an updated target dependency set synchronously with the replica server, so that the replica server subsequently executes a command according to the updated target dependency set; and determine a target execution sequence of the target command and each command in the updated target dependency set according to the target context number and the target timestamp that are corresponding to the target command, and a context number and a timestamp that are corresponding to each command in the updated target dependency set, and execute the target command and each command in the updated target dependency set according to the target execution sequence.

The processor 1001 is specifically configured to:

locally detect a first to-be-processed request that carries a context number equal to the target context number and a timestamp less than the target timestamp, use a command in the first to-be-processed request as the associated command, and add the associated command to the target dependency set; and locally detect a second to-be-processed request that carries a context number unequal to the target context number and a command in read/write conflict with the target command, use the command in the second to-be-processed request as the conflicted command, and add the conflicted command to the target dependency set.

The processor 1001 is specifically configured to:

forward the target request to the replica server, so that the replica server generates a replica dependency set according to the target context number and the target command in the target request, where the replica dependency set includes the associated command that is corresponding to the target context number and that is stored in the replica server and the conflicted command corresponding to the target command;

receive the replica dependency set fed back by the replica server, and compare the replica dependency set with the target dependency set; and when a comparison result is that the replica dependency set is inconsistent with the target dependency set, update the target dependency set according to the replica dependency set, and send an updated target dependency set to the replica server, so that the replica server synchronously stores the updated target dependency set, and the replica server subsequently executes a command according to the updated target dependency set.

The processor 1001 is specifically configured to:

detect whether the target request includes a preset timestamp; and if it is detected that the target request does not include the preset timestamp, use the current time as the target timestamp of the target request; or if it is detected that the target request includes the preset timestamp, add the target request to a wait queue; and when it is detected that a time arrives at the preset timestamp, extract the target request from the wait queue, and use the preset timestamp in the target request as the target timestamp of the target request.

The processor 1001 may be further configured to:

detect whether the target request carries a context number; and if it is detected that the target request does not carry a context number, select a target context number corresponding to the target command from a locally maintained context number set, and add the target context number to the target request; or if it is detected that the target request carries a context number, determine the carried context number as the target context number corresponding to the target command.

The processor 1001 is specifically configured to:

add the target request to a local to-be-executed request set, and instruct the replica server to add the target request to a to-be-executed request set in the replica server, so that the replica server executes a command according to the updated target dependency set when obtaining the target request from the execution request set in the replica server by means of extraction;

when the target request is obtained from the local to-be-executed request set by means of extraction, perform topological sorting on the target command and each command in the updated target dependency set according to the target context number and the target timestamp that are corresponding to the target command, and the context number and the timestamp that are corresponding to each command in the updated target dependency set, so as to obtain a connected graph, where the connected graph includes a topology structure constructed by the target command and each command in the updated target dependency set;

if the connected graph includes a strongly connected component, perform unidirectional sorting on the strongly connected component according to a context number and a timestamp of each command in the strongly connected component, so as to obtain a target execution sequence corresponding to all commands in the connected graph; or if the connected graph does not include a strongly connected component, determine the topological order obtained by means of topological sorting as the target execution sequence; and execute all the commands in the connected graph according to the target execution sequence.

The processor 1001 may be further configured to:

determine the target request that carries the target timestamp and the target context number as a to-be-processed message, and send the to-be-processed message to the client, so that the client initiates a next request, or sends the target context number to an associated client in a same context, where the context is formed by combining multiple threads.

Specifically, in a cloud computing data center that includes a server cluster, when the communications interface 1002 of a server 1000 in the server cluster receives a target request that carries a target command and that is sent by the client, the processor 1001 of the server 1000 may determine the server 1000 in which the processor 1001 is located as a master server, and determine another server in the cloud computing data center as a replica server. After the communications interface 1002 receives the target request, the processor 1001 may first detect whether the target request carries a context number. If the processor 1001 detects that the target request does not carry a context number, the processor 1001 may select a context number corresponding to the client from a context number set maintained by the processor 1001, that is, a context number corresponding to the target command, determine the context number corresponding to the target command as a target context number, and add the target context number to the target request; or if the processor 1001 detects that the target request carries a context number, the processor 1001 determines the context number carried in the target request as a target context number corresponding to the target command. The context number carried in the target request is pre-obtained by the client from the server 1000. The context number is a unique identifier of a context, the context may be obtained by combining multiple threads, and it may be considered that commands executed in order in a same context are in a context dependency. After determining the target context number, the processor 1001 may further detect whether the target request carries a preset timestamp. If the processor 1001 detects that the target request does not carry the preset timestamp, the processor 1001 uses a current time as a target timestamp of the target request; that is, the target command is corresponding to the target timestamp. By adding a timestamp, commands with a same context number can be executed in strict accordance with a timestamp sequence in subsequent command execution. Alternatively, if the processor 1001 detects that the target request carries the preset timestamp, the processor 1001 places the target request in a wait queue. When detecting that a time arrives at the preset timestamp, the processor 1001 extracts the target request from the wait queue. In this case, the processor 1001 may use the preset timestamp as the target timestamp of the target request.

After the processor 1001 determines the target timestamp, the processor 1001 may first create a dependency set corresponding to the target request, and determine the dependency set as a target dependency set. Then, the processor 1001 locally detects a first to-be-processed request that carries a context number equal to the target context number and a timestamp less than the target timestamp, uses a command in the first to-be-processed request as an associated command, and adds the associated command to the target dependency set. Further, the processor 1001 locally detects a second to-be-processed request that carries a context number unequal to the target context number and a command in read/write conflict with the target command, uses the command in the second to-be-processed request as a conflicted command, and adds the conflicted command to the target dependency set. The processor 1001 detects that a priority of the associated command is higher than that of the conflicted command. Both the associated command and the conflicted command are commands that are received by the master server and that have not been executed.

After the processor 1001 obtains the target dependency set that includes the associated command and the conflicted command, the communications interface 1002 may forward the target request to all replica servers in the cloud computing data center. The replica server further generates a replica dependency set according to the target context number and the target command in the target request. The replica dependency set includes the associated command that is corresponding to the target context number and that is stored in the replica server, and the conflicted command that is corresponding to the target command and that is stored in the replica server. After generating the replica dependency set, the replica server sends the replica dependency set to the communications interface 1002. The replica dependency set is a feedback from the replica server. In this case, the processor 1001 may receive replica dependency sets separately sent by all the replica servers, and compare each replica dependency set with the target dependency set. If a replica dependency set is inconsistent with the target dependency set, the processor 1001 adds a redundant associated command and a redundant conflicted command in the inconsistent replica dependency set to the target dependency set, so as to obtain an updated target dependency set. The processor 1001 sends the updated target dependency set to all the replica servers, so that all the replica servers synchronously store the updated target dependency set, and send an acknowledgment message to the master server. If a quantity of acknowledgment messages received by the communications interface 1002 reaches a preset quantity threshold, it indicates that most of the replica servers send the acknowledgment message; that is, most of the replica servers work normally. In this case, the processor 1001 may submit the target request; that is, the master server has determined the updated target dependency set. The communications interface 1002 may further send a submission request to all the replica servers, so that all the replica servers submit the target request, and prepare to execute the target command in the submitted target request.

A specific process in which the processor 1001 submits the target request is: The processor 1001 adds the target request to a local to-be-executed request set, and instructs the replica server to add the target request to a to-be-executed request set in the replica server, so that the replica server executes a command according to the updated target dependency set when obtaining the target request from an execution request set in the replica server by means of extraction. When the processor 1001 obtains the target request from the local to-be-executed request set by means of extraction, the processor 1001 performs topological sorting on the target command and each command in the updated target dependency set according to the target context number and the target timestamp that are corresponding to the target command, and a context number and a timestamp that are corresponding to each command in the updated target dependency set, and reverses an obtained sequence, so as to obtain a connected graph, where the connected graph includes a topology structure constructed by the target command and each command in the updated target dependency set. For example, commands with a same context number in the connected graph may be sorted in ascending order of timestamps. That is, a command with a smaller timestamp is executed before a command with a larger timestamp is executed. If there are two commands in conflict with each other in the connected graph, and the two commands are corresponding to different context numbers, the two commands may be sorted in ascending order of context numbers, or the two commands may be sorted according to another rule. Optionally, if some commands in the updated target dependency set are corresponding to a dependency set, the processor 1001 may add the dependency set corresponding to the commands to the connected graph. The dependency set corresponding to the commands may be referred to as an associated dependency set. The processor 1001 may further perform topological sorting on each command in the associated dependency set according to a context number and a timestamp corresponding to each command in the associated dependency set, so as to obtain a topology structure of all commands in the associated dependency set. If a context number corresponding to a command in the associated dependency set is different from a context number corresponding to a command in the updated target dependency set, and the two commands are not conflicted commands, there is no execution sequence between the two commands; that is, the two commands may be simultaneously executed, or may be executed one after the other.

After performing the topological sorting and obtaining the connected graph, the server 1000 may further detect whether the connected graph includes a strongly connected component in a ring structure, a mesh structure, or another structure. If the connected graph includes a strongly connected component, the server 1000 performs unidirectional sorting on the strongly connected component according to a context number and a timestamp of each command in the strongly connected component, so as to obtain a target execution sequence corresponding to all commands in the connected graph. In the unidirectional sorting of the strongly connected component, the sorting may be performed in ascending order of context numbers of all commands in the strongly connected component. If some commands in the strongly connected component have a same context number, the sorting may be further performed in ascending order of timestamps, so as to open up the strongly connected component and ensure that the connected graph no longer includes the strongly connected component. Alternatively, if the server 1000 detects that the connected graph does not include a strongly connected component when detecting whether the connected graph includes a strongly connected component in a ring structure, a mesh structure, or another structure, the server 1000 determines the topological order obtained by means of topological sorting as the target execution sequence.

The processor 1001 executes the program, so that after the server 1000 determines the target execution sequence, the server 1000 may execute all the commands in the connected graph according to the target execution sequence. When the replica server obtains the target request from the to-be-executed request set in the replica server by means of extraction, a process in which the replica server constructs a connected graph according to the updated target dependency set corresponding to the target request is the same as an execution process of the server 1000, and details are not described herein again. After determining the connected graph, the replica server may execute all commands in the connected graph according to the target execution sequence. Both the replica server and the master server construct a connected graph according to the updated dependency set. Therefore, the connected graph in the replica server is the same as that in the master server, a command executed by the replica server is the same as that executed by the master server, and an execution sequence followed by the replica server is the same as that followed by the master server, so that server cluster consistency is ensured.

In this embodiment of the present disclosure, a target timestamp and a target context number in a target request are obtained, so that a local associated command that belongs to the target context number and a local conflicted command in read/write conflict with the target command may be added to a target dependency set. The target request is forwarded to a replica server, so that the target dependency set is updated, and the replica server synchronously stores an updated target dependency set. Then, a target execution sequence of the target command and each command in the updated target dependency set is determined according to the target context number, the target timestamp, and a context number and a timestamp that are corresponding to each command in the updated target dependency set, and the target command and each command in the updated target dependency set are executed according to the target execution sequence. Therefore, according to the present disclosure, an execution sequence of all commands may be determined according to a timestamp and a context number, and a convergence operation does not need to be performed, so that a system delay and system complexity can be reduced. In addition, the replica server may execute a command according to the updated target dependency set, so that an execution sequence of the replica server can be the same as the target execution sequence, and server consistency can be ensured.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What are disclosed above are merely examples of embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. A command processing method, comprising:
   receiving, by a server, a target request that carries a target command and that is sent by a client, wherein the target command corresponds to a target context number, wherein a context number is a unique identifier of a context corresponding to the client and the context is obtained by combining multiple threads associated with a command execution sequence;
   using a current time as a target timestamp of the target request;
   adding a local associated command corresponding to the target context number and a local conflicted command corresponding to the target command to a target dependency set;
   forwarding the target request to a replica server, to enable the replica server to generate a replica dependency set according to the target context number and the target command in the target request, wherein the replica dependency set comprises the associated command that corresponds to the target context number and that is stored in the replica server and the conflicted command corresponding to the target command and that is stored in the replica server;
   receiving the replica dependency set fed back by the replica server, and comparing the replica dependency set with the target dependency set;
   when a comparison result is that the replica dependency set is inconsistent with the target dependency set, updating the target dependency set according to the replica dependency set, and sending an updated target dependency set to the replica server, so that the replica server synchronously stores the updated target dependency set, and the replica server subsequently executes a command according to the updated target dependency set;
   updating the target dependency set according to the feedback from the replica server, and storing an updated target dependency set synchronously with the replica server, so that the replica server subsequently executes a command according to the updated target dependency set; and
   determining a target execution sequence of the target command and each command in the updated target dependency set according to the target context number and the target timestamp that correspond to the target command, and a context number and a timestamp that correspond to each command in the updated target dependency set, and executing the target command and each command in the updated target dependency set according to the target execution sequence.

2. The method according to claim 1, wherein the adding a local associated command corresponding to the target context number and a local conflicted command corresponding to the target command to a target dependency set comprises:
   locally detecting a first to-be-processed request that carries a context number equal to the target context number and a timestamp less than the target timestamp, using a command in the first to-be-processed request as the local associated command, and adding the associated command to the target dependency set; and
   locally detecting a second to-be-processed request that carries a context number unequal to the target context number and a command in read/write conflict with the target command, using the command in the second to-be-processed request as the conflicted command, and adding the conflicted command to the target dependency set.

3. The method according to claim 1, wherein the using a current time as a target timestamp of the target request comprises:
   detecting that the target request does not comprise a preset timestamp; and
   using the current time as the target timestamp of the target request.

4. The method according to claim 1, wherein the using a current time as a target timestamp of the target request comprises:
   detecting that the target request comprises a preset timestamp;
   adding the target request to a wait queue;
   extracting the target request from the wait queue, and using the preset timestamp in the target request as the target timestamp of the target request when it is detected that a time arrives at the preset timestamp.

5. The method according to claim 1, wherein before the adding a local associated command corresponding to the target context number and a local conflicted command corresponding to the target command to a target dependency set, the method further comprises:
   detecting that the target request does not carry a context number;
   selecting a target context number corresponding to the target command from a locally maintained context number set; and
   adding the target context number to the target request.

6. The method according to claim 1, wherein before the adding a local associated command corresponding to the target context number and a local conflicted command corresponding to the target command to a target dependency set, the method further comprises:
   detecting that the target request carries a context number; and
   determining the carried context number as the target context number corresponding to the target command.

7. The method according to claim 1, wherein the determining a target execution sequence of the target command and each command in the updated target dependency set according to the target context number and the target timestamp that correspond to the target command, and a context number and a timestamp that correspond to each command in the updated target dependency set, and executing the target command and each command in the updated target dependency set according to the target execution sequence comprises:
- adding the target request to a local to-be-executed request set, and instructing the replica server to add the target request to a to-be-executed request set in the replica server, so that the replica server executes a command according to the updated target dependency set when obtaining the target request from the to-be-execution request set in the replica server by means of extraction;
- when the target request is obtained from the local to-be-executed request set by means of extraction, performing topological sorting on the target command and each command in the updated target dependency set according to the target context number and the target timestamp that correspond to the target command, and the context number and the timestamp that correspond to each command in the updated target dependency set, so as to obtain a connected graph, wherein the connected graph comprises a topology structure constructed by the target command and each command in the updated target dependency set;
- performing unidirectional sorting on a strongly connected component according to a context number and a timestamp of each command in the strongly connected component when the connected graph comprises the strongly connected component, so as to obtain a target execution sequence corresponding to all commands in the connected graph; and
- executing all the commands in the connected graph according to the target execution sequence.

8. The method according to claim 1, wherein the determining a target execution sequence of the target command and each command in the updated target dependency set according to the target context number and the target timestamp that correspond to the target command, and a context number and a timestamp that correspond to each command in the updated target dependency set, and executing the target command and each command in the updated target dependency set according to the target execution sequence comprises:
- adding the target request to a local to-be-executed request set, and instructing the replica server to add the target request to a to-be-executed request set in the replica server, so that the replica server executes a command according to the updated target dependency set when obtaining the target request from the to-be-execution request set in the replica server by means of extraction;
- when the target request is obtained from the local to-be-executed request set by means of extraction, performing topological sorting on the target command and each command in the updated target dependency set according to the target context number and the target timestamp that are corresponding to the target command, and the context number and the timestamp that are corresponding to each command in the updated target dependency set, so as to obtain a connected graph, wherein the connected graph comprises a topology structure constructed by the target command and each command in the updated target dependency set;
- determining a topological order obtained by means of topological sorting as the target execution sequence when the connected graph does not comprise a strongly connected component; and
- executing all the commands in the connected graph according to the target execution sequence.

9. The method according to claim 1, wherein after the using a current time as a target timestamp of the target request, the method further comprises:
- determining the target request that carries the target timestamp and the target context number as a to-be-processed message, and sending the to-be-processed message to the client, so that the client initiates a next request, or sends the target context number to an associated client in a same context.

10. The method according to claim 1, wherein the updating the target dependency set according to the feedback from the replica server comprises:
- in response to the replica dependency set being inconsistent with the target dependency set, updating the target dependency set by adding a redundant associated command and a redundant conflicted command in the inconsistent replica dependency set to the target dependency set.

11. A server, wherein the server comprises a processor, a communication interface, and a memory, wherein the communication interface is configured to communicate with a client and a replica server, and wherein the memory has a plurality of instructions stored thereon, that when processed by the processor, cause the processor to:
- receive, via the communication interface, a target request that carries a target command and that is sent by the client, wherein the target command corresponds to a target context number, wherein a context number is a unique identifier of a context corresponding to the client and the context is obtained by combining multiple threads associated with a command execution sequence;
- use a current time as a target timestamp of the target request;
- add a local associated command corresponding to the target context number and a local conflicted command corresponding to the target command to a target dependency set;
- forward, via the communication interface, the target request to the replica server, to enable the replica server to generate a replica dependency set according to the target context number and the target command in the target request, wherein the replica dependency set comprises the associated command that corresponds to the target context number and that is stored in the replica server and the conflicted command corresponding to the target command and that is stored in the replica server;
- receive, via the communication interface, the replica dependency set fed back by the replica server, and compare the replica dependency set with the target dependency set;
- when a comparison result is that the replica dependency set is inconsistent with the target dependency set, update the target dependency set according to the replica dependency set, and send an updated target dependency set to the replica server, so that the replica server synchronously stores the updated target dependency set, and the replica server subsequently executes a command according to the updated target dependency set;

update the target dependency set according to the feedback from the replica server, and store an updated target dependency set synchronously with the replica server, so that the replica server subsequently executes a command according to the updated target dependency set; and determine a target execution sequence of the target command and each command in the updated target dependency set according to the target context number and the target timestamp that correspond to the target command, and a context number and a timestamp that correspond to each command in the updated target dependency set, and execute the target command and each command in the updated target dependency set according to the target execution sequence.

12. The server according to claim 11, wherein the instructions, when processed by the processor, further cause the processor to:

locally detect a first to-be-processed request that carries a context number equal to the target context number and a timestamp less than the target timestamp, use a command in the first to-be-processed request as the associated command, and add the associated command to the target dependency set; and locally detect a second to-be-processed request that carries a context number unequal to the target context number and a command in read/write conflict with the target command, use the command in the second to-be-processed request as the conflicted command, and add the conflicted command to the target dependency set.

13. The server according to claim 11, wherein the instructions, when processed by the processor, further cause the processor to:

detect that the target request does not comprise a preset timestamp; and use the current time as the target timestamp of the target request.

14. The server according to claim 11, wherein the instructions, when processed by the processor, further cause the processor to:

detect that the target request comprises a preset timestamp;

add the target request to a wait queue;

extract the target request from the wait queue, and use the preset timestamp in the target request as the target timestamp of the target request when it is detected that a time arrives at the preset timestamp.

15. The server according to claim 11, wherein the instructions, when processed by the processor, further cause the processor to:

detect that the target request does not carry a context number; and select a target context number corresponding to the target command from a locally maintained context number set;

add the target context number to the target request.

16. The server according to claim 11, wherein the instructions, when processed by the processor, further cause the processor to:

detect that the target request carries a context number; and determine the carried context number as the target context number corresponding to the target command.

17. The server according to claim 11, wherein the instructions, when processed by the processor, further cause the processor to:

add the target request to a local to-be-executed request set, and instruct the replica server to add the target request to a to-be-executed request set in the replica server, so that the replica server executes a command according to the updated target dependency set when obtaining the target request from the to-be-execution request set in the replica server by means of extraction;

when the target request is obtained from the local to-be-executed request set by means of extraction, perform topological sorting on the target command and each command in the updated target dependency set according to the target context number and the target timestamp that correspond to the target command, and the context number and the timestamp that correspond to each command in the updated target dependency set, so as to obtain a connected graph, wherein the connected graph comprises a topology structure constructed by the target command and each command in the updated target dependency set;

perform unidirectional sorting on a strongly connected component according to a context number and a timestamp of each command in the strongly connected component when the connected graph comprises the strongly connected component, so as to obtain a target execution sequence corresponding to all commands in the connected graph; and execute all the commands in the connected graph according to the target execution sequence.

18. The server according to claim 11, wherein the instructions, when processed by the processor, further cause the processor to:

add the target request to a local to-be-executed request set, and instruct the replica server to add the target request to a to-be-executed request set in the replica server, so that the replica server executes a command according to the updated target dependency set when obtaining the target request from the to-be-execution request set in the replica server by means of extraction;

when the target request is obtained from the local to-be-executed request set by means of extraction, perform topological sorting on the target command and each command in the updated target dependency set according to the target context number and the target timestamp that correspond to the target command, and the context number and the timestamp that correspond to each command in the updated target dependency set, so as to obtain a connected graph, wherein the connected graph comprises a topology structure constructed by the target command and each command in the updated target dependency set;

determine a topological order obtained by means of topological sorting as the target execution sequence when the connected graph does not comprise a strongly connected component; and execute all the commands in the connected graph according to the target execution sequence.

19. The server according to claim 11, wherein the instructions, when processed by the processor, further cause the processor to:

determine the target request that carries the target timestamp and the target context number as a to-be-processed message, and send the to-be-processed message to the client, so that the client initiates a next request, or sends the target context number to an associated client in a same context.

* * * * *